US008676567B2

(12) United States Patent
Hollingsworth

(10) Patent No.: US 8,676,567 B2
(45) Date of Patent: Mar. 18, 2014

(54) AUTOMATIC TEXT SKIMMING USING LEXICAL CHAINS

(76) Inventor: William A. Hollingsworth, Commerce, GA (US)

( * ) Notice: Subject to any disclaimer, the term of this patent is extended or adjusted under 35 U.S.C. 154(b) by 0 days.

(21) Appl. No.: 13/327,887

(22) Filed: Dec. 16, 2011

(65) Prior Publication Data

US 2012/0089592 A1  Apr. 12, 2012

Related U.S. Application Data

(62) Division of application No. 12/192,258, filed on Aug. 15, 2008, now abandoned.

(60) Provisional application No. 60/956,160, filed on Aug. 16, 2007.

(51) Int. Cl.
*G06F 17/27* (2006.01)

(52) U.S. Cl.
USPC ............ 704/9; 704/10; 706/45; 707/711; 707/741

(58) Field of Classification Search
USPC ....................................... 704/9–10
See application file for complete search history.

(56) References Cited

U.S. PATENT DOCUMENTS

| | | | |
|---|---|---|---|
| 6,128,634 A | 10/2000 | Golovchinsky et al. | |
| 6,199,034 B1* | 3/2001 | Wical | 704/9 |
| 6,963,830 B1 | 11/2005 | Nakeo | |
| 6,978,274 B1 | 12/2005 | Gallivan et al. | |
| 7,234,942 B2 | 6/2007 | Hu et al. | |
| 7,305,336 B2 | 12/2007 | Polanyi et al. | |
| 7,451,395 B2 | 11/2008 | Brants et al. | |
| 7,558,778 B2 | 7/2009 | Carus et al. | |
| 7,627,590 B2 | 12/2009 | Boguraev et al. | |
| 7,783,640 B2 | 8/2010 | Lio et al. | |
| 8,041,126 B1* | 10/2011 | Naik et al. | 382/229 |
| 8,352,405 B2* | 1/2013 | Fang et al. | 706/50 |
| 2004/0029085 A1 | 2/2004 | Hu et al. | |
| 2004/0107088 A1* | 6/2004 | Budzinski | 704/10 |
| 2004/0122657 A1* | 6/2004 | Brants et al. | 704/9 |
| 2004/0268245 A1* | 12/2004 | Ishikura | 715/515 |
| 2005/0091591 A1 | 4/2005 | Boguraev et al. | |
| 2005/0108001 A1* | 5/2005 | Aarskog | 704/10 |
| 2005/0203970 A1 | 9/2005 | McKeown et al. | |
| 2005/0240957 A1* | 10/2005 | Tsunokawa et al. | 725/20 |
| 2006/0053000 A1* | 3/2006 | Moldovan et al. | 704/9 |
| 2007/0185831 A1 | 8/2007 | Churcher | |
| 2007/0219776 A1* | 9/2007 | Gamon et al. | 704/9 |
| 2008/0109399 A1 | 5/2008 | Liao et al. | |

(Continued)

OTHER PUBLICATIONS

Kamps et al. "Using WordNet to Measure Semantic Orientations of Adjectives" 2004.*

(Continued)

*Primary Examiner* — Greg Borsetti
(74) *Attorney, Agent, or Firm* — Merchant & Gould

(57) ABSTRACT

Automatic text skimming using lexical chains may be provided. First, at least one lexical chain may be created from an electronic document. Next, a list of positions within the electronic document may be created. The positions may include where at least one concept represented by one of the at least one lexical chain is mentioned. In addition, a list of the position where the at least one concept is mentioned may be assembled. A selection of at least one concept may be received from the list.

15 Claims, 25 Drawing Sheets

| Non-terms (Non-characteristic Adjective) | Terms (Characteristic Adjectives) |
|---|---|
| ~~different~~ example<br>~~common~~ prefix<br>~~bigger~~ dictionary<br>~~general~~ case<br>~~early~~ version | finite-state machine<br>linguistic model<br>prosodic feature<br>morphological category<br>statistical significance |

(56) References Cited

U.S. PATENT DOCUMENTS

| | | | |
|---|---|---|---|
| 2008/0201133 A1* | 8/2008 | Cave et al. | 704/10 |
| 2009/0083027 A1 | 3/2009 | Hollingsworth | |
| 2013/0204610 A1* | 8/2013 | Wu | 704/9 |

OTHER PUBLICATIONS

Angheluta et al. "The Use of Topic Segmentation for Automatic Summarization" 2002.*
Stokes et al. "Broadcast News Gisting Using Lexical Cohesion Analysis" 2004.*
Heid. "A linguistic bootstrapping approach to the extraction of term candidates from German text" 1998.*
Fox. "A Stop List for General Text" 1989.*
Park et al. "Automatic Glossary Extraction: Beyond Terminology Identification" 2002.*
Bernth et al. "Terminology Extraction for Global Content Management" 2002.*
International Search Report dated Apr. 2, 2009 cited in Application No. PCT/US2008/073293.
Meru Brunn et al., "Text Summarization Using Lexical Chains," 2001, XP-002510599, http://citeseerx.ist.psu.edu/viewdoc/summary?doi=10.1.1.15.9903, 3 pgs.
Bill Hollingsworth et al., "Human annotation of lexical chains: coverage and agreement measures," 2005, XP-002510600, http://www.cl.cam.ac.uk/{sht25/papers/sigir05.pdf, 7 pgs.
Nicola Stokes, "Applications of Lexical Cohesion Analysis in the Topical Detection and Tracking Domain," Apr. 2004, XP-002510601, http://citeseerx.ist.psu.edu/viewdoc/summary?doi=10.1.1.1.7079, pp. 1-263.
Regina Barzilay et al., "Using Lexical Chains for Text Summarization," Jul. 1997, XP-002510602, http://www.aclweb.org/anthology-new/W/W00/W00-1438.pdf, pp. 10-17.
H. Gregory Silber et al., "Efficiently Computed Lexical Chains as an Intermediate Representation for Automatic Text Summarization," Computational Linguistics, vol. 28, No. 7, Dec. 2002, XP-002510603, http://www.cis.udel.edu/{mccoy/publications/2002/Silber-McCoy-CL.pdf, pp. 1-11.
Branimir Boguraev et al., "Dynamic Presentation of Document Content for Rapid On-Line Skimming," Mar. 23, 1998, Symposium on Intelligent Text Summarization, XP-002096508, 10 pgs.
Allen, J., "Reading Machines for the Blind: The Technical Problems and the Methods Adopted for Their Solution," *IEEE Transactions on Audio and Electroacoustics*, vol. 21, No. 3, pp. 259-264 (Jun. 1973).
Barzilay, R., "Lexical Chains for Summarization," Master's Thesis, Ben-Gurion University of the Negev, pp. i-iv, 1-86 (Nov. 30, 1997).
Barzilay, R. et al., "Using Lexical Chains for Text Summarization," *Proceedings of the Intelligent Scalable Text Summarization Workshop (ISTS'97)*, ACL Madrid, Spain, 11 pages (1997).
Beeferman, D. et al., "Text Segmentation Using Exponential Models," *Proceedings of the Second Conference on Empirical Methods in Natural Language Processing*, Providence, Rhode Island, 12 pages (1997).
Bourigault, D., "Surface grammatical analysis for the extraction of terminological noun phrases," *Proceedings of the 15th International Conference on Computational Linguistics (COLING '92)*, Nantes, France, vol. 3, pp. 977-981 (1992).
Briscoe, T. et al., "Robust Accurate Statistical Annotation of General Text,"*Proceedings of the Third International Conference on Language Resources and Evaluation*, Las Palmas, Canary Islands, 6 pages (May 2002).
Brunn, M. et al., "Text Summarization Using Lexical Chains," *Proceedings of the Document Understanding Conference*, New Orleans, Louisiana, 6 pages (2001).
Choi, F., "A speech interface for rapid reading," *Proceedings of IEE Colloquium: Speech and Language Processing for Disabled and Elderly People*, London, England, 4 pages (2000).
Choi, F., "Advances in domain independent linear text segmentation," *6th Applied Natural Language Processing Conference*, Seattle, Washington, pp. 26-33 (2000).
Choi, F., "Content-Based Text Navigation," Ph.D. Thesis, University of Manchester, pp. 1-236 (Mar. 2002).
Choi, F., "Improving the efficiency of speech interfaces for text navigation," *Proceedings of the International Conference on Computers Helping People with special Needs: ICCHP '00*, Karlsruhe, Germany, 5 pages (2000).
Church, K., "Char_align: A Program for Aligning Parallel Texts at the Character Level," *Proceedings of the 31st Annual Meeting of the Association for Computational Linguistics*, Columbus, Ohio, pp. 1-8 (1993).
Church, K. et al., "Word Association Norms, Mutual Information, and Lexicography," *Proceedings of the 27th annual meeting on Association for Computational Linguistics*, Vancouver, British Columbia, Canada, pp. 76-83 (1989).
Dillon, A. et al., "Human factors of journal usage and design of electronic texts," *Interacting with Computers*, vol. 1, No. 2, pp. 183-189 (1989).
Dunning, T., "Accurate Methods for the Statistics of Surprise and Coincidence," *Computational Linguistics*, vol. 19, No. 1, pp. 61-74 (1993).
Ellman, J., "Using Roget's Thesaurus to Determine the Similarity of Texts," Ph.D. Thesis, University of Underland, pp. i-ix, 1-211 (Jun. 2000).
Elworthy, D., "Does Baum-Welch Re-estimation Help Taggers?," *Proceedings of the Fourth ACL Conference on Applied Natural Language Processing (ANLP '94)*, Stuttgart, Germany, 7 pages (1994).
Fung, P. et al., "A Technical Word and Term Translation Aid using Noisy Parallel Corpora across Language Groups," *Machine Translation*, vol. 12, Nos. 1-2, 32 pages (1997).
Gale, W. et al., "One Sense Per Discourse," *Proceedings of the DARPA Speech and Natural Language Workshop*, Harriman, New York, pp. 233-237 (1992).
Green, S., "Automatically generating hypertext by computing semantic similarity," Ph.D. Thesis, University of Toronto, pp. 1-113 (Oct. 14, 1997).
Green, S., "Building Hypertext Links by Computing Semantic Similarity," *IEEE Transactions on Knowledge and Data Engineering*, vol. 11, No. 5, pp. 713-730 (Sep./Oct. 1999).
Green, S., "Building hypertext links in newspaper articles using semantic similarity," *Proceedings of the 3rd Workshop on Applications of Natural Language to Information Systems*, Vancouver, Canada, 13 pages (1997).
Grefenstette, G., "Producing Intelligent Telegraphic Text Reduction to provide an Audio Scanning Service for the Blind," *Proceedings of the AAAI Symposium on Intelligent Text Summarization*, Palo Alto, California, 7 pages (1998).
Hearst, M., "Multi-paragraph segmentation of expository text," *Proceedings of the 32nd Annual Meeting on Association for Computational Linguistics*, Las Cruces, New Mexico, pp. 9-16 (1994).
Hearst, M., "TextTiling: Segmenting Text into Multi-paragraph Subtopic Passages," *Computational Linguistics*, vol. 23, No. 1, pp. 33-64 (1997).
Hirst, G. et al., "Lexical Chains as Representations of Context for the Detection and Correction of Malapropisms," *WordNet: An Electronic Lexical Database*, Edited by Christiane Fellbaum, Chapter 13, pp. 305-332, The MIT Press (1998).
Hoey, M., *Patterns of Lexis in Text*, Oxford University Press, vii-xvii, 3-25 (1991).
Hollingsworth, B. et al., "Retrieving Hierarchical Text Structure from Typeset Scientific Articles—a Prerequisite for E-Science Text Mining," *Proceedings of the 4th UK E-Science All Hands Meeting*, Nottingham, United Kingdom, 7 pages (2005).
Hollingsworth, W., "Using Lexical Chains to Characterise Scientific Text," Ph.D. Thesis, University of Cambridge, pp. 1-167 (Sep. 17, 2007).
Justeson, J. et al., "Technical terminology: some linguistic properties and an algorithm for identification in text," *Natural Language Engineering*, vol. 1, No. 1, pp. 9-27 (1995).
Kan, M. et al., "Linear Segmentation and Segment Significance," *Proceedings of the 6th Workshop on Very Large Corpora*, Montreal, Canada, pp. 197-205 (1998).

(56) References Cited

OTHER PUBLICATIONS

Kang. B., "A Novel Approach to Semantic Indexing Based on Concept," *The Companion Volume to the Proceedings of 41st Annual Meeting of the Association for Computational Linguistics*, Sapporo, Japan, 6 pages (2003).
Klebanov, B., "Measuring Semantic Relatedness Using People and WordNet," *Proceedings of the Human Language Technology Conference of the North American Chapter of the ACL*, New York, pp. 13-16 (Jun. 2006).
Klebanov, B., "Using People and WordNet to Measure Semantic Relatedness," *Proceedings of the Human Language Technology Conference of the North American Chapter of the ACL*, Detailed Technical Report, pp. 1-13 (Apr. 16, 2006).
Klebanov, B. et al., "Reader-based exploration of lexical cohesion," *Lang. Res. Eval.*, vol. 40, pp. 109-126 (2006).
Lahtinen, T., "Automatic indexing: An approach using an index term corpus and combining linguistic and statistical methods," Ph.D. Thesis, University of Helsinki, pp. 1-224 (2000).
Lapata, M., "The Disambiguation of Nominalizations," *Computational Linguistics*, vol. 28, No. 3, pp. 357-388 (2002).
Lapata, M. et al., "Determinants of Adjective-Noun Plausibility," *Proceedings of the 9th Conference of the European Chapter of the Association for Computational Linguistics*, Bergen, Norway, pp. 1-7 (1999).
Lascarides, A. et al., "Pragmatics and Word Meaning," *Journal of Linguistics*, vol. 34, No. 2, pp. 1-23 (1998).
Leed, R. et al., "Lexical functions and language learning," *SEEJ*, vol. 23, No. 1, pp. 104-113 (1979).
Martinez, D. et al., "One Sense per Collocation and Genre/Topic Variations," *Proceedings of the 2000 Joint SIGDAT Conference on Empirical Methods in Natural Language Processing and Very Large Corpora: Held in Conjunction with the 38th Annual Meeting of the Association for Computational Linguistics*, Hong Kong, 9 pages (2000).
Miller, G. et al., "Introduction to WordNet: An On-line Lexical Database," pp. 1-86 (Revised Aug. 1993).
Miller, G. et al., "Semantic networks of English," *Cognition*, vol. 41, pp. 197-229 (1991).
Minnen, G. et al., "Applied morphological processing of English," *Natural Language Engineering*, vol. 7, pp. 1-18 (2001).
Mochizuki, H. et al., "Text Segmentation with Multiple Surface Linguistic Cues," *36th Annual Meeting of the Association for Computational Linguistics and 17th International Conference on Computational Linguistics*, Quebec, Canada, pp. 881-885 (1998).
Morris, J. et al., "Lexical Cohesion Computed by Thesaural Relations as an Indicator of the Structure of Text," *Computational Linguistics*, vol. 17, No. 1, pp. 21-48 (1991).
Morris, J. et al., "The Subjectivity of Lexical Cohesion in Text," Chapter X, 7 pages (2004).
Morris, J. et al., "The Subjectivity of Lexical Cohesion in Text," *American Association for Artificial Intelligence*, 4 pages (Copyright 2004).
Nahnsen, T. et al., "Lexical Chains and Sliding Locality Windows in Content-based Text Similarity Detection," *Second International Joint Conference on Natural Language Processing*, Jeju Island, Korea, pp. 150-154 (2005).
Nunberg, G. et al., "Idioms," *Language*, vol. 70, No. 3, pp. 491-538 (1994).
Okumura, M. et al., "Query-based summarization based on lexical chaining," *Computational Intelligence*, vol. 16, No. 4, pp. 578-585 (2000).
Okumura, M. et al., "Word Sense Disambiguation and Text Segmentation Based on Lexical Cohesion," *The 15th International Conference on Computational Linguistics (COLING)*, vol. 2, Kyoto, Japan, pp. 755-761 (1994).
Passonneau, R. et al., "Intention-based segmentation: Human reliability and correlation with linguistic cues," *Proceedings of the 31st Annual Meeting of the Association for Computational Linguistics*, Columbus, Ohio, pp. 148-155 (1993).
Pevzner, L. et al., "A Critique and Improvement of an Evaluation Metric for Text Segmentation," *Computational Linguistics*, vol. 28, No. 1, pp. 19-36 (2002).
Popwich, F. et al., "Processing complex noun phrases in a natural language interface to a statistical database," *The 15th International Conference on Computational Linguistics, COLING*, vol. 1, Nantes, France, pp. 46-52 (1992).
Reynar, J., "An automatic method of finding topic boundaries," *32nd Annual Meeting of the Association for Computational Linguistics*, Las Cruces, New Mexico, pp. 331-333 (1994).
Reynar, J., "Topic segmentation: Algorithms and applications," Ph.D. Thesis, University of Pennsylvania, pp. i-xviii, 1-169 (1998).
Rupp, C. et al., "Flexible Interfaces in the Application of Language Technology to an eScience Corpus," *Proceedings of the 4th UK E-Science All Hands Meeting*, Nottingham, United Kingdom, 8 pages (2006).
Sag, I. et al., "Multiword Expressions: A Pain in the Neck for NLP," *Proceedings. of the 3rd International Conference on Intelligent Text Processing and Computational Linguistics*, 15 pages (2002).
Salton, G. et al., "Selective Text Utilization and Text Traversal," *Proceedings of ACM Hypertext '93*, Seattle, Washington, pp. 131-144 (Nov. 1993).
Shaw, J. et al., "Ordering Among Premodifiers," *Proceedings of the 37th Annual Meeting of the Association for Computational Linguistics (ACL '99)*, College Park, Maryland, 9 pages (1999).
Silber, H. et al., "Efficient Text Summarization Using Lexical Chains," *Proceedings of the 5th international Conference on Intelligent User Interfaces*, New Orleans, Louisiana, pp. 252-255 (2000).
Smadja, F., "Retrieving Collocations from Text: Xtract," *Computational Linguistics*, vol. 19, No. 1, pp. 143-177 (1993).
Smadja, F. et al., "Automatically extracting and representing collocations for language generation," *Proceedings of the 28th Annual Meeting on Association for Computational Linguistics*, Pittsburgh, Pennsylvania, pp. 252-259 (1990).
Smadja, F. et al., "Translating Collocations for Use in Bilingual Lexicons," *Proceedings of the Workshop on Human Language Technology*, Plainsboro, New Jersey, pp. 152-156 (1994).
Stairmand, M., "Textual Context Analysis for Information Retrieval," *Proceedings of the 20th Annual International ACM SIGIR Conference on Research and Development in Information Retrieval*, Philadelphia, Pennsylvania, pp. 140-147 (1997).
Stokes, N., "Applications of Lexical Cohesion Analysis in the Topic Detection and Tracking Domain," Ph.D. Thesis, National University of Ireland, Dublin, pp. i-xiii, 1-263 (Apr. 2004).
Stokes, N., "Spoken and Written News Story Segmentation using Lexical Chains," *Proceedings of the Student Workshop at HLT-NAACL, Companion Volume*, Edmonton, Canada, 6 pages (2003).
St-Onge, D., "Detecting and Correcting Malapropisms with Lexical Chains," Master's Thesis, University of Toronto, pp. i-vi, 1-62 (Mar. 1995).
Teufel, S., "Argumentative Zoning: Information Extraction from Scientific Text," Ph.D. Thesis, University of Edinburgh, pp. 1-352 (1999).
Wermter, J. et al., "Collocation Extraction Based on Modifiability Statistic," *Proceedings of the 20th International Conference on Computational Linguistics*, Geneva, Switzerland, 7 pages (2004).
Yarowsky, D., "One sense per collocation," *Proceedings of the DARPA Speech and Natural Language Workshop*, Princeton, New Jersey, pp. 266-271 (1993).
Alam et al. "Web Page Summarization for Handheld Devices: A Natural Language Approach" 2003.
Carthy et al. "Lexical Chains for Topic Tracking" 2002.
Chen et al. "Multi-Document Summarization Based on Lexical Chains" 2005.
Yu et al. "Automatic Text Summarization Based on Lexical Chins and Structural Features" Aug. 1, 2007.
Wong, "ANSES Automatic News Summarization and Extraction System" 2002.
Kolla. "Automatic Text Summarization Using Lexical Chains: Algorithms and Experiments" 2002.
Carthy. "Lexical Chains versus Keywords for Topic Tracking" 2004.
Santos. "ALEXIA—Acquisition of Lexical Chains for Text Summarization" Feb. 2006.

(56) References Cited

OTHER PUBLICATIONS

Hayama et al. "Personalized Environment for Skimming Documents" 2003.
Saggion et al. "Concept Identification and Presentation in the Context of Technical Text Summarization" 2000.
Chen et al. "Automatic Text Summarization Based on Lexical Chains" 2005.
Yanmin et al. Automatic Text Summarization Based on Textural Cohesion May 2007.
Yeh et al. "Text Summarization using a trainable summarizer and latent semantic analysis" 2004.
Mani. "Recent Developments in Text Summarization" 2001.
Alam et al. "Structure and Unstructured Document Summarization: Design of a Commercial Summarizer using Lexical Chains" 2003.
Stuhrenberg et al. "Web-based Annotation of Anaphoric Relations and Lexical Chains" Jun. 2007.
Reeve et al. "BioChain: Lexical Chaining Methods for Biomedical Text Summarization" 2006.

* cited by examiner

1. Introduction
2. Distributional Similarity Functions
3. Empirical Comparison
4. The Skew Divergence
5. Discussion

FIG. 4

1. Introduction
   - training corpus, training data, training partition, training set
   - similarity metric, information-theoretic metric, skew metric 2. Distributional Similarity Functions
   - cooccurrence, cooccurrence pair, conditional verb cooccurrence probability 3. Empirical Comparison
   - empirical comparison, empirical approach, empirical distribution, empirical result
   - data, training data, performance data 4. The Skew Divergence
   - skew divergence, skew metric
   - divergence, skew divergence, total divergence 5. Discussion
   - data, training data, performance data

FIG. 5

- similarity, similarity function, distributional similarity, similarity metric, similarity measure, distributional similarity measure, semantic similarity, similarity ranking

- probability, confusion probability, cooccurrence probability, probability distribution, probability estimate, positive probability

- distribution, potential proxy distribution, joint distribution, empirical distribution, product distribution
nce data

FIG. 6

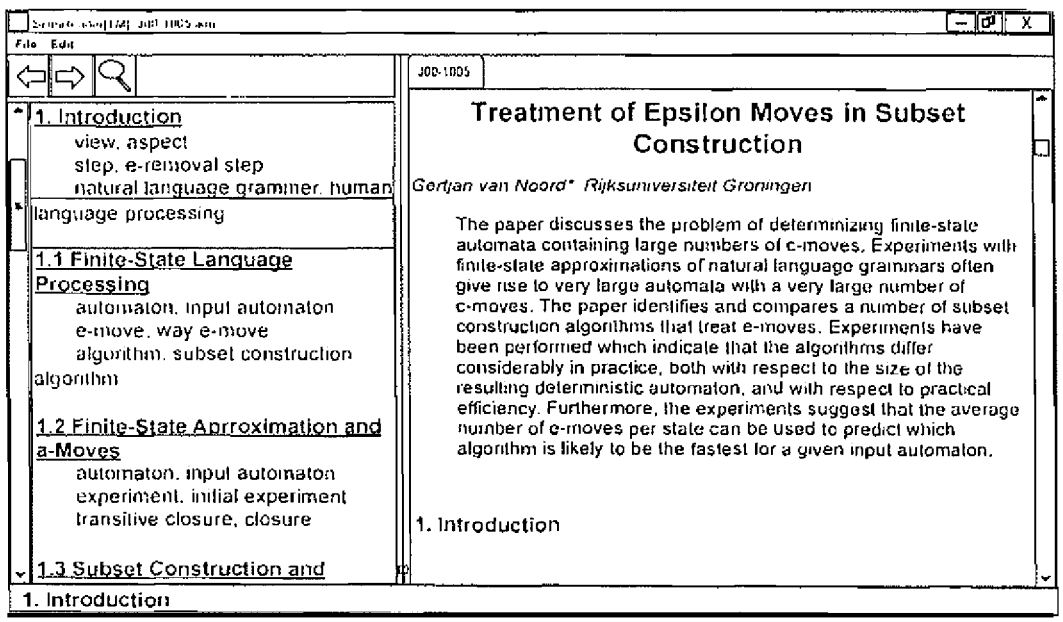

FIG. 7

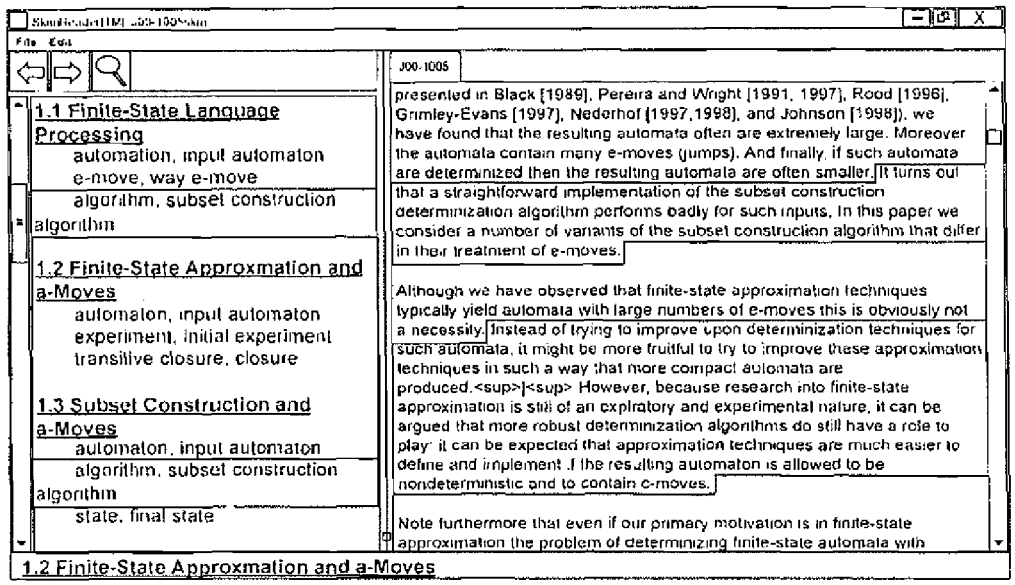

FIG. 8

| Score | Lexical Chain |
|---|---|
| 27 | function (12), similarity function (8), use (2), weight function (1), novel function (1), role (1), comparison purpose (1), purpose (1) |
| 23 | divergence (17), difference (5), divergence total divergence (1) |
| 22 | probability (8), confusion probability (7), chance (2), word cooccurrence probability (1), verb cooccurrence probability (1) unigram probability (1), base language model probability (1), base probability (1) |
| 19 | measure (11), similarity measure (7), amount (1) |
| 15 | distribution (8), proxy distribution (2), probability distribution (2), joint distribution (1), average distribution (1), product distribution (1) |

FIG. 9

| Score | Lexical Chain |
|---|---|
| 22 | function (12), similarity function (8), weight function (1), novel function (1) |
| 20 | probability (8), confusion probability (7), word cooccurrence probability (1), verb cooccurrence probability (1), unigram probability (1), base language model probability (1), base probability (1) |
| 18 | divergence (17), divergence total divergence (1) |
| 18 | measure (11), similarity measure (7) |
| 18 | distribution (8), proxy distribution (2), probability distribution (2), joint distribution (1), average distribution (1), product distribution (1) |

FIG.10

| |
|---|
| probability, confusion probability, probability distribution, cooccurrence probability, probability estimate, word cooccurrence probability, language model probability, unigram probability, probability estimation |
| similarity, similarity function, similarity measure, similarity metric, similarity ranking, similarity function schema |

FIG.11

| | |
|---|---|
| probability estimation, probability, conditional cooccurrence probability, chance, positive probability, model probability, conditional probability, likelihood, probability estimate |
| distribution, proxy distribution, probability distribution, average distribution, joint distribution, product distribution, empirical distribution |

FIG. 12

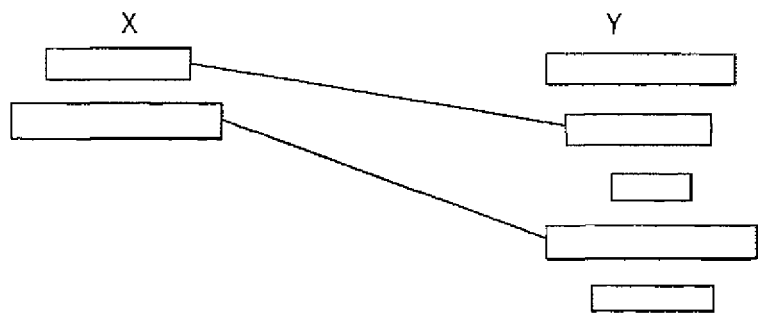

FIG. 13

| | |
|---|---|
| semantic similarity | similarity |
| distributional similarity | similarity |
| mathematical certainty | certainty |
| unseen event | event |

FIG. 14

| Non-terms<br>(Non-characteristic Adjective) | Terms<br>(Characteristic Adjectives) |
|---|---|
| ~~different~~ example<br>~~common~~ prefix<br>~~bigger~~ dictionary<br>~~general~~ case<br>~~early~~ version | finite-state machine<br>linguistic model<br>prosodic feature<br>morphological category<br>statistical significance |

FIG. 15

|  | Adjective | Predication Score | Non-characteristicness Score |
|---|---|---|---|
| Characteristic | acoustic | 0.2% | 21 |
|  | textual | 0.3% | 26 |
|  | experimental | 0.3% | 44 |
|  | rhetorical | 0.4% | 45 |
|  | prosodic | 0.7% | 63 |
|  | ⋮ | ⋮ | ⋮ |
| Non-characteristic | appropriate | 10.9% | 2762 |
|  | correct | 11.2% | 4317 |
|  | relevant | 13.8% | 3712 |
|  | similar | 19% | 8148 |
|  | necessary | 42.3% | 10028 |

FIG. 16

|  | Adjective | Gradeability Score | Non-characteristicness Score |
|---|---|---|---|
| Characteristic | experimental | 0.8% | 124 |
|  | textual | 1.1% | 101 |
|  | acoustic | 1.1% | 115 |
|  | rhetorical | 1.8% | 184 |
|  | prosodic | 2.3% | 217 |
|  | ⋮ | ⋮ | ⋮ |
| Non-characteristic | appropriate | 6.0% | 1829 |
|  | necessary | 8.0% | 2146 |
|  | relevant | 11.5% | 3826 |
|  | good | 13.9% | 3741 |
|  | similar | 15.7% | 7962 |

FIG. 17

|  | Adjective | Conjunction Score | Non-characteristicness Score |
|---|---|---|---|
| Marked characteristic (intuitively characteristic) | experimental<br>textual<br>acoustic<br>rhetorical<br>prosodic | na<br>0.2%<br>0.1%<br>0.2%<br>0.2% | na<br>21<br>10<br>28<br>19 |
| Marked characteristic (intuitively non-characteristic) | appropriate<br>correct<br>necessary<br>relevant<br>similar | 0.1%<br>0.1%<br>0.1%<br>0.1%<br>na | 40<br>66<br>41<br>63<br>na |
| Marked Non-characteristic (intuitively non-characteristic) | vague<br>slow<br>transparent<br>concise<br>elegant | 2.1%<br>2.1%<br>2.2%<br>2.3%<br>2.8% | 35<br>31<br>27<br>40<br>31 |

FIG. 18

| Paper $P_1$ | | Paper $P_2$ | |
|---|---|---|---|
| Annotator | Chains | Annotator | Chains |
| A | 12 | G | 16 |
| B | 27 | H | 31 |
| C | 19 | I | 7 |
| D | 24 | J | 7 |
| E | 4 | K | 7 |
| F | 20 | L | 35 |
|  |  | M | 21 |
| Total | 106 | Total | 124 |

FIG. 20

| Paper $P_1$ | | Paper $P_2$ | |
|---|---|---|---|
| Annotator | Terms | Annotator | Terms |
| A | 8.25 | G | 9.94 |
| B | 3.07 | H | 5.03 |
| C | 2.95 | I | 8.00 |
| D | 3.25 | J | 16.71 |
| E | 14.50 | K | 9.14 |
| F | 6.60 | L | 4.94 |
|  |  | M | 4.71 |

FIG. 21

| | | | |
|---|---|---|---|
| ith | romance | cepstral | nn |
| bootstrapping | sem | cartesian | whih |
| consequent | spanish-english | word-class | speaking |
| hungarian | regardless | information-theoretic | spanish |
| respective | editorial | idf | componential |
| referent | nonverbal | auditory | smallest |
| chinese-english | deux | presidential | individuating |
| case-based | clos | forall | ff |
| tonal | det | lexical-functional | system-generated |
| optical | top-ranked | browser | quadruple |
| typological | russian | sparseness | simplest |
| multinomial | above | latest | illocutionary |
| sequent | indexing | eg | scopal |
| multi-dimensional | tuple | urban | calculating |
| muc-7 | pi | ft | residual |
| honorific | working | english-to-japanese | magic |
| sheer | interclausal | oriental | average |
| whole | tectogrammatical | korean | infinitival |
| annual | i-th | french | missing |
| advanced | evolutionary | naval | collocate |
| digital | history-based | particular | entropy-based |
| architectural | authoring | back-off | extra-grammatical |
| post-processing | fastus | australian | electric |
| gerundive | turn-taking | non-restrictive | abstracted |
| tactical | triple | right-most | wordnet-based |
| official | hmm-based | rel | parseval |
| original | specialist | spectral | english |
| numeral | univocal | capitalized | disambiguating |
| n-best | pictorial | hoc | targeted |
| anonymous | translingual | diphthong | k-th |
| cut-off | muc-6 | example-based | concessive |
| secret | wl | left | experimental |
| muc -3 | posterior | hyponymy | stack-based |
| preprocessing | graphic | glottal | module |
| ultimate | morphemic | typesetting | cn |
| performance | electrical | multi | online |
| biomedical | czech | senseval | human-like |
| african | integrated | cross-lingual | classification-based |

FIG. 19

| IDs | Lexical Chain |
|---|---|
| A9, B6 | training corpus, training set, training partition training datum |
| B12, D11 | divergence, skew divergence |
| B25, F18 | weighting, weight function |
| C4, D4 | synonym, semantic similarity, similar word |
| D19, F7 | backoff method, interpolation method backoff smoothing method |

FIG. 22

| IDs | Lexical Chain |
|---|---|
| A15, F32 | type, subtype |
| B7, F9 | hypothesis, working hypothesis |
| B27, F28 | stative verb, non-stative verb |
| B23, G14 | adaptation, refinement |

FIG. 23

| Paper $P_1$ | | | Paper $P_2$ | | |
|---|---|---|---|---|---|
| Annotator | Chains | Terms | Annotator | Chains | Terms |
| A | 75.0% | 29.5% | G | 68.7% | 29.4% |
| B | 100% | 66.6% | H | 61.2% | 33.7% |
| C | 66.6% | 36.1% | I | 71.4% | 18.7% |
| D | 52.6% | 40.8% | J | 85.7% | 41.2% |
| E | 50.0% | 28.3% | K | 71.4% | 22.9% |
| F | 90.0% | 43.3% | L | 77.1% | 36.9% |
| | | | M | 66.6% | 29.0% |

FIG. 24

| Terms With Adjectives | A | B | C | D | E | F |
|---|---|---|---|---|---|---|
| arbitrary probability distribution | | | | ✓ | | |
| asymmetric fashion | | ✓ | | | | |
| automatically-constructed thesaurus | | | | ✓ | | |
| average distribution | | | ✓ | | | ✓ |
| backoff smoothing | | | ✓ | | | |
| base model | | | | | ✓ | |
| best performance | | ✓ | | | | |
| better similarity ranking | | ✓ | | | | ✓ |
| binary decision task | | | ✓ | | | ✓ |
| broad range | | ✓ | | | | |
| closest neighbor | ✓ | | | ✓ | | |
| common similarity measure | | ✓ | ✓ | | | |
| conditional cooccurrence probability | ✓ | | | ✓ | | |
| correct answer | | | | | | ✓ |
| different measure | | ✓ | | | | |
| direct object | | | | ✓ | ✓ | ✓ |
| distance-weighted average | | | ✓ | | ✓ | ✓ |
| distributional similarity | ✓ | ✓ | ✓ | | ✓ | ✓ |
| empirical comparison | ✓ | ✓ | ✓ | ✓ | | |
| euclidean distance | | | ✓ | | | ✓ |
| experimental framework | | | | ✓ | | ✓ |
| extreme dissimilarity | | ✓ | | | | ✓ |
| frequent noun | | | | | | ✓ |
| full model | | | | | ✓ | |
| good similarity measure | | ✓ | | | | ✓ |
| inaccurate representation | | ✓ | | | | |
| information-theoretic metric | | | | | ✓ | ✓ |
| insignificant | ✓ | | | | | |
| low frequency event | ✓ | ✓ | | ✓ | ✓ | ✓ |
| mathematical certainty | ✓ | | | | | |
| most measure | | ✓ | | | | |
| mutual information | | | ✓ | | | ✓ |

FIG. 25

| Terms With Adjectives | A | B | C | D | E | F |
|---|---|---|---|---|---|---|
| natural language processing | | | ✓ | | | |
| nearest neighbor | ✓ | | ✓ | ✓ | | ✓ |
| negative argument | | | | ✓ | | |
| new similarity metric | | ✓ | | | | ✓ |
| nonparametric measure | | | | | | ✓ |
| novel function | | ✓ | | | | ✓ |
| positive probability | | | | | ✓ | |
| potential proxy distribution | ✓ | | | | | |
| previous | | ✓ | | | | |
| random variable | | | | ✓ | | |
| reasonable event | | ✓ | | | | |
| relative frequency | ✓ | | ✓ | | | ✓ |
| same information | | | | | ✓ | |
| semantic similarity | ✓ | ✓ | | ✓ | ✓ | ✓ |
| similar word | | | | ✓ | ✓ | ✓ |
| similarity-based estimation | ✓ | ✓ | | | | ✓ |
| skew divergence | | | ✓ | | ✓ | ✓ |
| smooth word cooccurrence probability | ✓ | ✓ | | | | ✓ |
| sparse datum | | ✓ | ✓ | ✓ | | ✓ |
| state-of-the-art technology | | ✓ | | | | |
| statistical method | | | | ✓ | | |
| statistically significant | | | | | | ✓ |
| superior performance | | | ✓ | | ✓ | |
| symmetric | | | | | | ✓ |
| total divergence | | | | | | ✓ |
| transitive verb | | | | | ✓ | ✓ |
| unique similarity function schema | | ✓ | | | | |
| unseen cooccurrence | ✓ | ✓ | | ✓ | ✓ | ✓ |
| unsmoothed relative frequency | ✓ | | ✓ | | | ✓ |
| weight function | | | ✓ | | | ✓ |

FIG. 26

| Adjective | Non-characteristicness |
|---|---|
| information-theoretic | 0.9 |
| average | 1.1 |
| experimental | 1.2 |
| best | 1.3 |
| total | 1.5 |
| skew | 1.9 |
| previous | 2.0 |
| semantic | 2.0 |
| weighting | 2.0 |
| similarity-based | 2.0 |
| distance-weighted | 2.1 |
| nearest | 2.4 |
| state-of-the-art | 2.6 |
| empirical | 2.9 |
| mathematical | 3.0 |

FIG. 27

| Adjective | Non-characteristicness |
|---|---|
| conditional | 3.1 |
| new | 3.2 |
| statistical | 3.2 |
| relative | 3.4 |
| distributional | 3.5 |

FIG. 28

| Adjective | Non-characteristicness |
|---|---|
| arbitrary (probability distribution) | 12.2 |
| broad (range) | 12.6 |
| commom (similarity measure) | 12.9 |
| correct (answer) | 19.0 |
| different (measure) | 15.2 |
| frequent (noun) | 21.0 |
| good (similarity measure) | 22.7 |
| low (frequency event) | 33.2 |

FIG. 29

| |
|---|
| probability distribution, distribution, average distribution, joint distribution, product distribution |
| unsmoothed relative frequency, relative frequence, frequency, unigram frequency |
| confusion probability, positive probability, probability, joint distribution, base probability |

FIG. 30

| |
|---|
| distributional similarity function, similarity-based, similarity ranking, distributional similarity, distributional similarity measure, similarity, similarity function, similarity metric, common similarity measure |
| cooccurrence, cooccurrence probability, word cooccurrence probability, cooccurrence pair, conditional verb cooccurrence, verb-object cooccurrence pair |
| distance-weighted, distance-weighted average, distance-weighted average model |

FIG. 31

| ID | Lexical Chain |
|---|---|
| C7 | base language model (3), language-modeling domain (1) |
| C15 | unigram probability (1), base language model probability (1), unigram frequency (1) |

FIG. 32

| A | → | B | B | → | A |
|---|---|---|---|---|---|
| A 1 | → | B 1 | B1 | → | A1 |
| A 2 | → |  | B2 | → | A10 |
| A 3 | → | B 26 | B3 | → | A7 |
| A 4 | → | B 7 | B4 | → | – |
| A 5 | → | B 24 | B5 | → | A4 |
| A 6 | → | B 2 | B6 | → | A9 |
| A 7 | → | B 3 | B7 | → | A4 |
| A 8 | → | B 10 | B8 | → | – |
| A 9 | → | B 6 | B9 | → | – |
| A 10 | → | B 2 | B10 | → | A8 |
| A 11 | → | – | B11 | → | A5 |
| A 12 | → | B 20 | B12 | → | A1 |
|  |  |  | B13 | → | – |
|  |  |  | B14 | → | – |
|  |  |  | B15 | → | – |
|  |  |  | B16 | → | A12 |
|  |  |  | B17 | → | – |
|  |  |  | B18 | → | A11 |
|  |  |  | B19 | → | A11 |
|  |  |  | B20 | → | A12 |
|  |  |  | B21 | → | – |
|  |  |  | B22 | → | – |
|  |  |  | B23 | → | – |
|  |  |  | B24 | → | A5 |
|  |  |  | B25 | → | – |
|  |  |  | B26 | → | A3 |
|  |  |  | B27 | → | – |

FIG. 33

| Annotators | | | | Best Match |
|---|---|---|---|---|
| A | → B | → C | → D | |
| A1 | B1* | C6 | D5 | B1 |
| A2 | – | C10* | – | C10 |
| A3 | B26 | C17 | D24* | D24 |
| A4 | B7 | C1* | D2 | C1 |
| A5 | B24 | C9* | D12 | C9 |
| A6 | B2* | – | – | B2 |
| A7 | B3 | C12* | – | C12 |
| A8 | B10* | C11 | D8 | B10 |
| A9 | B6* | – | D14 | B6 |
| A10 | B2* | C10 | D8 | B2 |
| A11 | – | C16 | D7* | D7 |
| A12 | B20 | – | D8* | D8 |

FIG. 34

| Matches per chain | Frequency |
|---|---|
| 3 | 30 |
| 2 | 28 |
| 1 | 13 |
| 0 | 11 |

FIG. 35

| | | |
|---|---|---|
| T<br>Type | Term Identity | → Dice (TD)<br>→ Jaccard (TJ)<br>→ Overlap (TO)<br>→ Cosine (TC) |
| P | Term Identity + Partial Term Overlap | → Dice (PD)<br>→ Jaccard (PJ)<br>→ Overlap (PO)<br>→ Cosine (PC) |
| F<br>Token | Term Identity | → Dice (FD)<br>→ Jaccard (FJ)<br>→ Overlap (FO)<br>→ Cosine (FC) |
| | Not Tried | |

FIG. 36

| A | TD | | TJ | | TO | | TC | |
|---|---|---|---|---|---|---|---|---|
| | B | Score | B | Score | B | Score | B | Score |
| A1 | B1 | .333 | B1 | .200 | B12 | .500 | B1 | .333 |
| A2 | – | 0 | – | 0 | – | 0 | – | 0 |
| A3 | B1 | .222 | B1 | .125 | B26 | .500 | B26 | .235 |
| A4 | B7 | .545 | B7 | .375 | B7 | 1 | B7 | .612 |
| A5 | B11 | .400 | B11 | .250 | B24 | .500 | B11 | .400 |
| A6 | B2 | .307 | B2 | .181 | B2 | .500 | B2 | .333 |
| A7 | B3 | .333 | B3 | .200 | B3 | .500 | B3 | .353 |
| A8 | B10 | .727 | B10 | .571 | B10 | .800 | B10 | .730 |
| A9 | B6 | 1 | B6 | 1 | B6 | 1 | B6 | 1 |
| A10 | B2 | .363 | B2 | .222 | B2 | .444 | B2 | .369 |
| A11 | B11 | .200 | B11 | .111 | B19 | .500 | B11 | .230 |
| A12 | B20 | .260 | B20 | .150 | B20 | .750 | B20 | .344 |

FIG. 37

| Chain | Best match |
|---|---|
| A4 | B7 |
| A6 | B2 |
| A7 | B3 |
| A8 | B10 |
| A9 | B6 |

FIG. 38

| | Chains | | | | | | |
|---|---|---|---|---|---|---|---|
| Measure | A1 | A2 | A3 | A5 | A10 | A11 | A12 |
| TD | B1 | – | B1 | B11 | B2 | B11 | B20 |
| TJ | B1 | – | B1 | B11 | B2 | B11 | B20 |
| TO | B12 | – | B26 | B24 | B2 | B19 | B20 |
| TC | B1 | – | B26 | B11 | B2 | B11 | B20 |
| FD | B12 | – | B26 | B11 | B2 | B11 | B20 |
| FJ | B12 | – | B26 | B11 | B2 | B19 | B2 |
| FO | B12 | – | B26 | B11 | B10 | B19 | B20 |
| FC | B12 | – | B26 | B11 | B2 | B19 | B20 |
| PD | B1 | B2 | B1 | B11 | B2 | B11 | B10 |
| PJ | B1 | B2 | B1 | B11 | B2 | B11 | B10 |
| PO | B1 | B2 | B26 | B24 | B2 | B19 | B20 |
| PC | B1 | B2 | B1 | B11 | B2 | B11 | B20 |
| Human | B1 | – | B1 | B24 | B2 | – | B20 |

FIG. 39

| Chain A3 |
|---|
| distributional similarity (5), similiar (33), distance-weighted (5) semantic similarity (1), distance (7), dissimilarity (1), similarity-based (1), commonality (2), difference (6) |

| Chain B1 | Chain B26 |
|---|---|
| distributional similarity function (1), similarity-based (1), similarity ranking (2), distributional similarity (5), distributional similarity measure (2), similarity (28), similarity function (11), similarity metric (4), common similarity measure (1) | distance (7), euclidean distance (1) |

FIG. 40

| Chain A1 |
|---|
| measure (8), distributional similarity measure (2), similarity function (8) function (11), divergence (17), similarity measure (2), similarity metric (3), metric (3), coefficient (7) |

| Chain B1 | Chain B12 |
|---|---|
| distributional similarity function (1), similarity-based (1), similarity ranking (2), distributional similarity (5), distributional similarity measure (2), similarity (28), similarity function (11), similarity metric (4), common similarity measure (1) | divergence (17), skew divergence (1) |

FIG. 41

| Measure | Precision | Recall | F-measure |
|---|---|---|---|
| TD | 89.7% | 90.3% | 90.0% |
| TJ | 90.4% | 90.4% | 90.4% |
| TO | 84.5% | 88.3% | 86.3% |
| TC | 90.4% | 91.0% | 90.7% |
| FD | 81.8% | 84.4% | 83.0% |
| FJ | 82.9% | 84.7% | 83.8% |
| FO | 80.7% | 84.6% | 82.5% |
| FC | 80.0% | 82.9% | 81.4% |
| PD | 90.4% | 91.9% | 91.1% |
| PJ | 91.5% | 91.9% | 91.7% |
| PO | 89.0% | 93.3% | 91.0% |
| PC | 91.3% | 93.3% | 92.2% |

FIG. 42

| Measure | Precision | Recall | F-measure |
|---|---|---|---|
| TD | 78.3% | 78.3% | 78.3% |
| TJ | 78.3% | 78.3% | 78.3% |
| TO | 80.8% | 80.8% | 80.8% |
| TC | 77.5% | 77.5% | 77.5% |
| FD | 58.0% | 58.0% | 58.0% |
| FJ | 58.0% | 58.0% | 58.0% |
| FO | 72.2% | 72.2% | 72.2% |
| FC | 58.3% | 58.3% | 58.3% |
| PD | 80.2% | 80.2% | 80.2% |
| PJ | 81.9% | 81.9% | 81.9% |
| PO | 79.4% | 79.4% | 79.4% |
| PC | 81.9% | 81.9% | 81.9% |

FIG. 43

| Algorithm | Average Score |
|---|---|
| bc | 56.08 |
| b | 54.85 |
| bwc | 52.27 |
| bs | 50.92 |
| bwsc | 49.05 |
| bsc | 48.53 |
| ba | 48.50 |
| bws | 43.67 |
| bw | 43.33 |

FIG. 46

| Algorithm | Average Score |
|---|---|
| bc | 53.64 |
| ba | 52.34 |
| bwc | 51.61 |
| b | 47.93 |
| bsc | 44.84 |
| bwsc | 44.60 |
| bs | 44.41 |
| bw | 43.69 |
| bws | 42.10 |

FIG. 48

|  | ba | bc | bsc | bs | bwsc | bwc | bws | bw |
|---|---|---|---|---|---|---|---|---|
| b | > | - | > | > | > | > | > | > |
| bw | - | < | - | - | - | - | - | - |
| bws | - | < | - | - | - | - | - | - |
| bwc | - | < | - | - | - | - | - | - |
| bwsc | - | < | - | - | - | - | - | - |
| bs | - | - | - | - | - | - | - | - |
| bsc | - | - | - | - | - | - | - | - |
| bc | > | - | - | - | > | > | > | > |

FIG. 47

|  | ba | bc | bsc | bs | bwsc | bwc | bws | bw |
|---|---|---|---|---|---|---|---|---|
| b | - | < | < | - | < | - | - | - |
| bw | < | < | < | < | < | < | - | - |
| bws | - | < | < | < | < | < | - | - |
| bwc | - | < | - | - | - | - | > | > |
| bwsc | - | < | - | - | - | - | > | > |
| bs | - | - | - | - | - | - | > | > |
| bsc | - | - | - | - | - | - | > | > |
| bc | > | - | - | - | - | > | > | > |

FIG. 49

| Algorithm | Average Score |
|---|---|
| bc | 59.32 |
| bwc | 58.03 |
| ba | 57.77 |
| bsc | 56.23 |
| bs | 55.72 |
| bwsc | 55.50 |
| b | 53.78 |
| bws | 49.97 |
| bw | 48.10 |

|  | ba | bc | bsc | bs | bwsc | bwc | bws | bw |
|---|---|---|---|---|---|---|---|---|
| b | < | < | - | - | < | < | - | > |
| bw | < | < | < | - | < | < | - | - |
| bws | < | < | < | - | < | < | - | - |
| bwc | - | - | - | > | - | - | > | > |
| bwsc | - | - | - | < | - | - | > | > |
| bs | < | < | < | - | > | < | - | - |
| bsc | - | - | - | > | - | - | > | > |
| bc | > | - | - | > | - | - | > | > |

| Algorithm | Average Score |
|---|---|
| ba | 59.69 |
| bc | 58.66 |
| bsc | 58.11 |
| bwsc | 58.10 |
| bwc | 57.43 |
| bs | 54.61 |
| b | 53.40 |
| bw | 52.94 |
| bws | 52.73 |

|  | ba | bc | bsc | bs | bwsc | bwc | bws | bw |
|---|---|---|---|---|---|---|---|---|
| b | < | < | < | < | < | < | < | - |
| bw | < | < | < | - | < | < | < | - |
| bws | < | < | < | - | < | < | - | > |
| bwc | - | - | - | > | - | - | > | > |
| bwsc | - | - | - | > | - | - | > | > |
| bs | < | < | < | - | < | < | - | - |
| bsc | - | - | - | > | - | - | > | > |
| bc | - | - | - | > | - | - | > | > |

AUTOMATIC TEXT SKIMMING USING LEXICAL CHAINS

RELATED APPLICATION

This application is a divisional of U.S. application Ser. No. 12/192,258, filed on Aug. 15, 2008 now abandoned, which under provisions of 35 U.S.C. §119(e), the claimed the benefit of U.S. Provisional Application No. 60/956,160, filed Aug. 16, 2007, both of which are incorporated herein by reference in their entirety.

BACKGROUND

Automatic text skimming using lexical chains is a process for enabling people to skim electronic documents. In some situations, a person who is blind or sight-impaired, reading any printed information is difficult. For example, reading with a sight impairment is difficult and time consuming. Also, listening to text read out loud is slow. When searching for the right scientific paper, a blind or sight-impaired researcher cannot (as a sighted reader might) quickly skim through a paper, identifying key points to determine if the paper is relevant.

SUMMARY

Automatic text skimming using lexical chains may be provided. First, at least one lexical chain may be created from an electronic document. Next, a list of positions within the electronic document may be created. The positions may include where at least one concept represented by one of the at least one lexical chain is mentioned. In addition, a list of the position where the at least one concept is mentioned may be assembled. A selection of at least one concept may be received from the list.

It is to be understood that both the foregoing general description and the following detailed description are examples and explanatory only, and should not be considered to restrict the invention's scope, as described and claimed. Further, features and/or variations may be provided in addition to those set forth herein. For example, embodiments of the invention may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present invention. In the drawings:

FIG. 4 is a table of contents for a paper;

FIG. 5 is an annotated table of contents;

FIG. 6 is a listing of global chains for a paper;

FIG. 7 shows a screenshot of a text skimmer;

FIG. 8 show a screenshot of a text skimmer having highlighted text;

FIG. 9 shows lexical chains scoring;

FIG. 10 shows a table consisting of terms that share the headword function;

FIG. 11 shows lexical chains generated using the shared modifier relation;

FIG. 12 shows lexical chains;

FIG. 13 shows asymmetric comparisons between two lexical chains;

FIG. 14 shows a table showing technical terms;

FIG. 15 shows examples of adjectives from the ACL Anth Corpus;

FIG. 16 shows some adjectives taken from the ACL Anth Corpus along with results from a Predication test;

FIG. 17 shows some adjectives taken from the ACL Anth Corpus along with the results from the Gradability test;

FIG. 18 shows a table showing conjunction test results;

FIG. 19 shows a table showing characteristic adjectives;

FIG. 20 shows variation in the number of chains created by annotators;

FIG. 21 shows the number of terms used in lexical chains;

FIGS. 22 and 23 show identical lexical chains by different annotators for papers $P_1$ and $P_2$, respectively;

FIG. 24 shows percentages of human-generated lexical chains that contain one or more terms involving an adjective;

FIGS. 25 and 26 show examples of all adjectives used by annotators for paper $P_1$;

FIG. 27 shows adjectives used by humans from paper $P_1$ that were deemed to be characteristic by adjective tests;

FIG. 28 shows adjectives used by humans with a non-characteristicness score;

FIG. 29 adjectives used by an annotator and assigned high non-characteristicness scores by filters.

FIG. 30 shows some human-generated lexical chains comprising terms that share the same head;

FIG. 31 shows pairs of terms;

FIG. 32 shows lexical chains;

FIG. 33 shows examples of two human-generated lexical chains created by the same annotator for two different concepts in the same text;

FIG. 34 shows an example of a comparison of lexical chains created by two annotators;

FIG. 35 shows chains from annotators that were chosen in the Coarse gold standard;

FIG. 36 shows statistics of how choices;

FIG. 37 shows type-based agreement scores;

FIG. 38 shows instances when measures agree with a gold standard;

FIG. 39 shows disagreement between measures shown in FIG. 38;

FIG. 40 shows different chain matches under different similarity measures;

FIG. 41 shows different chain matches under different similarity measures for a second case;

FIG. 42 shows coarse comparison results for the 12 similarity measures;

FIG. 43 shows the fine comparison results for the 12 similarity measures;

FIG. 46 shows similarity scores for task 1 (paper $P_1$) with $\chi=3$;

FIG. 47 shows significance for task 1 (paper $P_1$) with $\chi=3$;

FIG. 48 shows similarity scores for task 1 (paper $P_2$) with $\chi=16$;

FIG. 49 shows significance for task 1 (paper $P_2$) with $\chi=16$;

DETAILED DESCRIPTION

Figure 1:
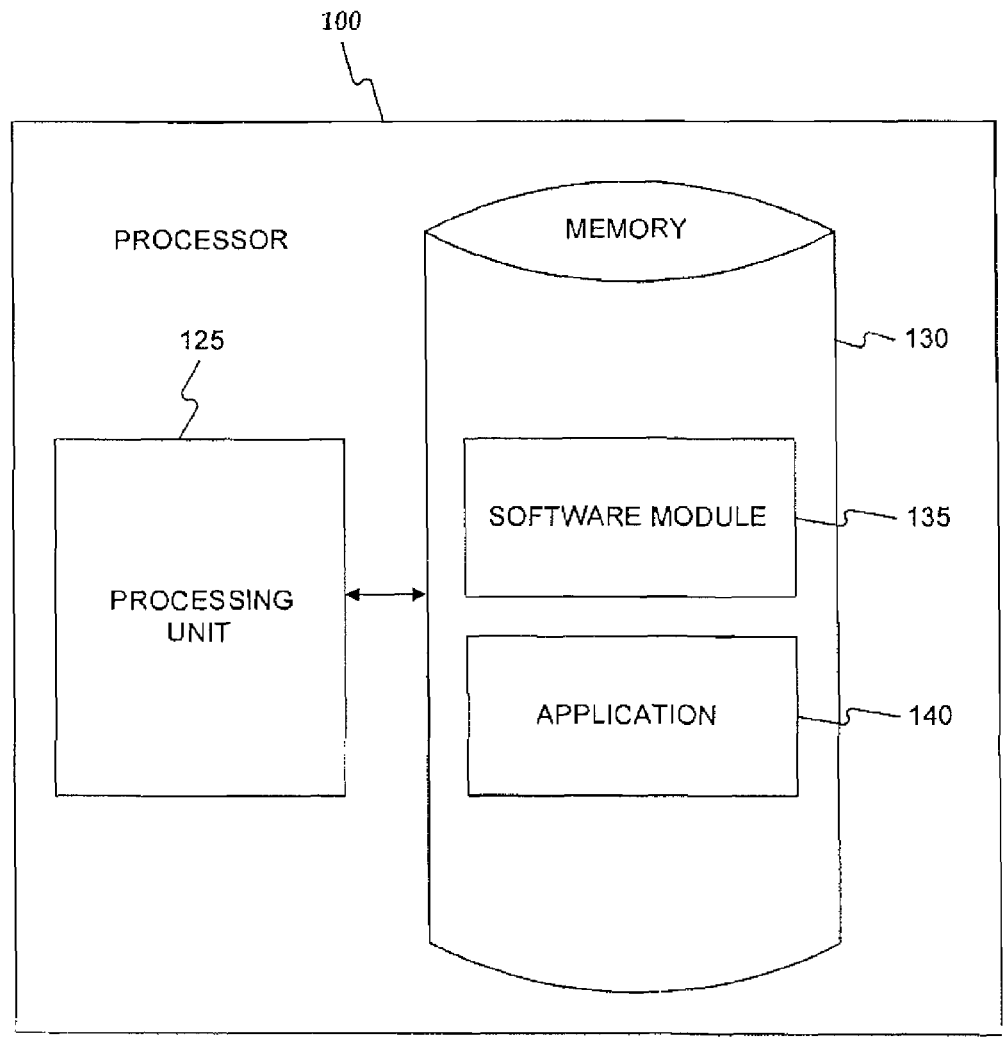
FIG. 1 is a block diagram of a system including a computing device.

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

Automatic text skimming using lexical chains may be provided. Consistent with embodiments of the present invention, the difficulty that sight-impaired (e.g. blind) people have in accessing information from text may be addressed. In particular, such users may be provided with an aid for finding content in texts. To assist readers, sight-impaired or otherwise, topics may be represented by lexical chains. The lexical chains may connect directly to individual text units (e.g. individual terms or multi-word terms). The lexical chains may be presented to a user such that the user can select a particular lexical chain. Once the lexical chain is selected, text within a document may be highlighted to allow the user to focus only on relevant text. In addition, text not associated with the selected lexical chain may be hidden, so as to not be visible to the user, leaving only relevant text visible.

Other concepts consistent with embodiments of the invention include, but are not limited to, evaluating the quality of automatically-identified lexical chains in text, improving the quality of automatically-generated lexical chains in text, identifying adjectives used in technical terms, navigating through an electronic text using lexical chains, and navigating through a collection of electronic texts using lexical chains.

A list of definitions follows. While the following definition list states how each term may be defined, other definitions may apply and the terms are not so limited.

Lexical Chain: A collection of words or multiword phrases, (henceforth terms) that are related to each other or to the same concept or topic. For example, words in a lexical chain may be related by semantic relations (e.g., they may be synonyms).

Collocation: Adjacent words that occur together with probability (or frequency) greater than chance.

Technical Term: A type of collocation that has special meaning in a technical domain or field (i.e., technical terminology).

Characteristic Adjective: An adjective that is characteristic (or necessary) in representing the meaning of a technical term in a text. If a characteristic adjective is removed from a technical term then the meaning of the original term is lost. For example, "intellectual property" is a technical term in the field of law. If the adjective "intellectual" is removed (leaving the word "property") then the meaning of the original term is lost. This is a novel definition and the algorithm for recognizing characteristic adjectives is also novel.

Non-characteristic Adjective: A non-characteristic adjective as an adjective that is not characteristic (or necessary) in representing the meaning of a technical term in a text. If a non-characteristic adjective is removed from a technical term (or collocation) then the original term is not lost. For example, "valuable property" refers to property that has high value. However, "valuable property" is not a technical term having a separate meaning from "property", as is the case with "intellectual property". This is a novel definition and the algorithm for distinguishing between characteristic adjectives and non-characteristic adjectives is also novel.

Annotated Table of Contents: A representation (or visualization) of the contents of a text that may consist of the following:
1. A list of chapter titles or section/subsection titles in a text may be presented.
2. Under each title from stage 1, a list of concepts (or lexical chains) referred to in that chapter/section/subsection may be presented.
3. Each concept (or lexical chain) from stage 2 may be associated with some or all sentences in the text that refer to that concept. Clicking on a concept may highlight some or all sentences in the text that refer to the concept.
4. Each concept (or lexical chain) from stage 2 may be associated with one or more pages from the text that refer to the concept somewhere on the page.

To construct an Annotated Table of Contents
1. Start with a text.
2. Create lexical chains from the text. Each lexical chain represents a concept discussed in the text.
3. For each lexical chain, create a list of positions in the paper (denoted by sentence numbers and possibly page numbers) where the concept represented by that lexical chain is mentioned.
4. Using chapter, section, or subsection heading information (provided by the paper's author as part of the written paper), make records of how many times each chain is mentioned in each section or subsection.
5. For each chapter/section/subsection, make a list of the most used lexical chains in that chapter/section/subsection.
6. Assemble a list of all of the chapters, sections, or subsections and their titles from the paper and all of the lists of lexical chains used in each section or subsection. This makes up the Annotated Table of Contents. The user is presented with the concepts (or lexical chains) directly in the Annotated Table of Contents.

To build a document index for a search engine using lexical chains:
1. An annotated table of contents (including lexical chains) is created for every document to be indexed by the search engine.
2. Each lexical chain is recorded along with the locations of all sentences in the document that reference that lexical chain.
3. The contribution of each lexical chain to the representation of the document is computed. For example, a lexical chain representing a key concept in the document receives a higher score than a lexical chain representing a minor point in the document.
4. All technical terms (one or more words) used in any lexical chain for the document are recorded in a list.
5. For each technical term, and for each lexical chain for the document, the contribution of the term to the content of the lexical chain is computed.

The document index may include the following information for each document:
1. A list of lexical chains created for the document. For each lexical chain, the following may be produced:
   (a) a list of all locations in the document (denoted by sentence numbers and possibly page numbers) referencing the lexical chain;
   (b) a list of all page numbers in the document that correspond to pages containing one or more sentences referencing the lexical chain;
   (c) a number (score) denoting the contribution of that chain to the representation of the document;
2. A list of all terms used in lexical chains for that document. For each term, the following may be produced:
   (a) a list of all lexical chains (denoted by chain identifiers) for the document that contain that term;
   (b) a number (score) denoting the contribution of that term to the representation of the document—This score may be computed using the following:
      i. for each lexical chain containing the term, a number (score) denoting the contribution of the term to that lexical chain;
      ii. for each lexical chain containing the term, the contribution of that lexical chain to the representation of the document;
      iii. for each lexical chain containing the term, the contribution of the term to that lexical chain;
3. A list of all single words used in any technical term in any lexical chain for the document. For each such single word, the following may be produced:
   (a) a list of all lexical chains (denoted by chain identifiers) for the document that contain that word in a technical term or by itself;
   (b) for each lexical chain containing a term that includes that word, a number (score) denoting the contribution of the word to that lexical chain—This score may be computed using the following:
      i. the number of terms in the lexical chain that contain the word;
      ii. for each term used in the lexical chain that contains the word, the number of words in that term;
      iii. for each term used in the lexical chain that contains the word, whether the word is the head word of that term (right-most word) or a modifier (to the left of the head);
   (c) a number (score) denoting the contribution of that word to the representation of the document—This score may be computed using the following:
      i. for each lexical chain that includes that word, the contribution of that chain to the representation of the document;
      ii. for each lexical chain that includes that word, the contribution of the word to that lexical chain;
      iii. for each technical term containing the word, the number of words in that term;
      iv. for each technical term containing the word, whether the word is the head word of that term (right-most word) or a modifier (to the left of the head);

The index also includes the following global information:
1. A list of all terms used in any lexical chain for any document in the index. For each term in the index, a sorted list of documents (denoted by document identifiers) containing the term in a lexical chain—The list of document identifiers is sorted in descending order based on the contribution scores of the term to the documents.
2. A list of all single words used in any lexical chain for any document in the index. For each single word in the index, a sorted list of documents (denoted by document identifiers) containing the word in a lexical chain—The list of document identifiers is sorted in descending order based on the contribution scores of the word to the documents.

The text of a document may or may not be stored in the document index.

To perform a concept-based search using the lexical chain index:
1. A user submits a query to the search engine.
2. Check combinations of adjacent words in the query to see if the query contains one or more multiword terms from the list of terms in the index.
3. For each single word in the query, retrieve from the index the list of all documents that have a lexical chain that includes the word. Note that this list also contains all documents containing multiword terms that include that word.
4. Take the union of the lists of documents retrieved above.
5. For each document in the combined list, compute the relevance of that document to the query—This may be computed using the following:
   (a) the number of words in the query;
   (b) the number of words in the query that are used in the document by a lexical chain;
   (c) for each word in the query that is used in the document by a lexical chain, the contribution of the word to the representation of the document;
   (d) the number of multiword terms in the index that were found to be present in the query;
   (e) for each multiword term in the query, the contribution of that term to the representation of the document;

Note that since only words or terms in the query that appear in lexical chains are used in the search, there is no need for a stop-list (i.e. a list of common words like 'the' that may add noise to a search). A stoplist may or may not be used in this algorithm or in conjunction with this algorithm.

The method described above for performing a keyword search can be applied to entire sentences or even entire paragraphs as follows:
1. Extract a list of words, technical terms, or collocations from a natural language query (i.e., a sentence or paragraph).
2. Perform the concept-based search described in Section 6 using the list of terms produced in the previous step as the final search query.

The Adjective Filtering Algorithm produces as output a list of adjectives deemed to be non-characteristic by the algorithm. Adjectives in this list can be treated as adjectives that do not occur in technical terminology.

This algorithm can be used to identify characteristic adjectives and to distinguish between characteristic adjectives and non-characteristic adjectives.

Since technical terms make up a subset of all collocations, methods of identifying collocations can return as output collocations that are not technical terms.

The Adjective Filtering Algorithm can be combined with an existing independent algorithm for identifying collocations to produce a more accurate list of technical terms. This can be done by either of the following two algorithms.

Algorithm 1:
1. Start with a list of characteristic adjectives produced by the Adjective Filtering Algorithm.
2 Take a collocation that was identified by any collocation recognition algorithm.

3. If the collocation begins with an adjective A, check to see if A is included in the list of characteristic adjectives.
4. If the answer to stage 3 is YES then mark the collocation as a technical term.
5. If the answer to stage 3 is NO then mark the collocation as not being a technical term.

Algorithm 2:
1. Start with a list of non-characteristic adjectives produced by the Adjective Filtering Algorithm.
2. Take a collocation that was identified by any collocation recognition algorithm.
3. If the collocation begins with an adjective A, check to see if A is included in the list of characteristic adjectives.
4. If the answer to Step 3 is YES then mark the collocation as not being a technical term.
5. If the answer to Step 3 is NO then mark the collocation as a technical term.

An embodiment consistent with the invention may be implemented within a system for automatic text skimming using lexical chains. The system may include a processor in which the invention may be embodied. The processor may comprise a memory storage and a processing unit coupled to the memory storage. The aforementioned memory, processing unit, and other components may be implemented within a system for automatic text skimming using lexical chains. Any suitable combination of hardware, software, and/or firmware may be used to implement the memory, processing unit, or other components. By way of example, the memory, processing unit or other components may be implemented with computing device 100 shown in FIG. 1.

As shown in FIG. 1, computing device 100 may include a processing unit 125 and a memory 130. Memory 130 may include a software module 135 and an application 140. While executing on processing unit 125, software module 135 may perform any process including, for example, any process (or sub-part of any process) described below such as, but not limited to, method 200. Application 140 may be used, for example, to temporarily store various information while executing one or more stages of any process described below.

Computing device 100 may be implemented using a personal computer, network computer, mainframe, or other similar microcomputer-based workstation. The processor may though comprise any type of computer operating environment, such as hand-held devices, multiprocessor systems, microprocessor-based or programmable sender electronic devices, minicomputers, mainframe computers, and the like. The processor may also be practiced in distributed computing environments where tasks are performed by remote processing devices. Furthermore, the processor may comprise a mobile terminal, such as a smart phone, a cellular telephone, a cellular telephone utilizing wireless application protocol (WAP), personal digital assistant (PDA), intelligent pager, portable computer, a hand held computer, a conventional telephone, a WiFi access point, or a facsimile machine. The aforementioned systems and devices are exemplary and the processor may comprise other systems or devices.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present invention may be embodied in hardware and/or in software (including firmware, resident software, micro-code, etc.). In other words, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as examples for embodiments of the invention.

Figure 2:
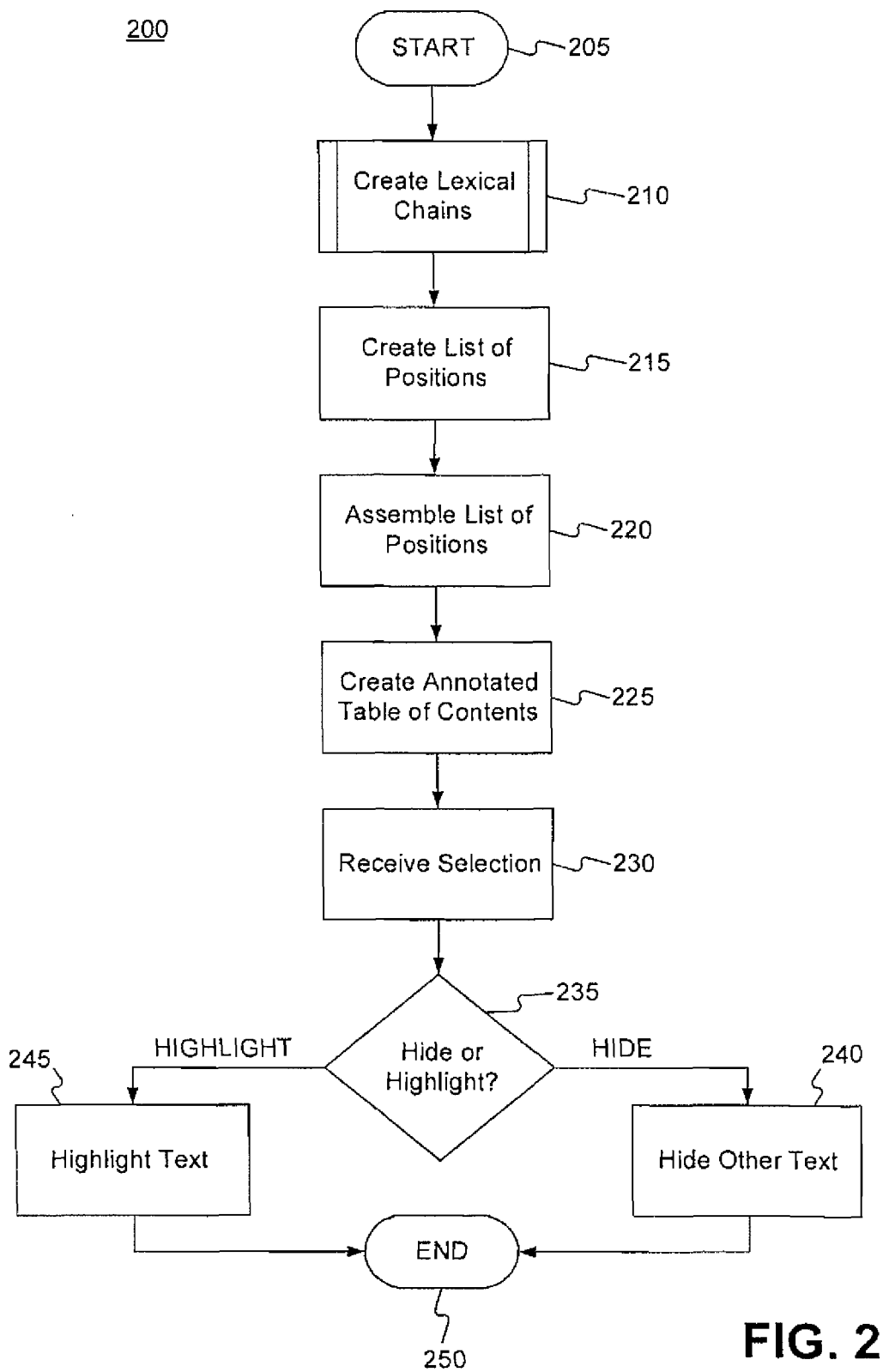
FIG. 2 is a flow chart of a method for providing automatic text skimming using lexical chains.

FIG. 2 is a flow chart setting forth the general stages involved in a method 200 consistent with an embodiment of the invention for automatic text skimming using lexical chains. Method 200 may be implemented using a computing device 100 as described in more detail above with respect to FIG. 1. Ways to implement the stages of method 200 will be described in greater detail below. Method 200 may begin at starting block 205 and proceed to subroutine 210 where computing device 100 may create at least one lexical chain from an electronic document. For example, computing device 100 may determine at least one major topic from the electronic document. Creating the at least one lexical chain from the electronic document will be described in greater detail below with respect to FIG. 3.

When working with lexical chains, rules about which words (or terms) can belong in lexical chains may be required. For example, it may be conventional to allow a term to be added to no more than one chain. Such similarities could be defined with thesaurus relations.

Lexical chain "strength" is used as an indication of the relevance of a lexical chain to a text. Three possible factors that may contribute to a chain's strength include reiteration, density, and length. Reiteration is the repetition of a lexical chain's terms in a text and adds to the strength of that chain. The more the terms from a lexical chain occur in a text, the more that chain is referenced and thus the more prominent the chain is. For density, the denser a lexical chain is in a text, the stronger it is in that text. The length of a lexical chain (e.g., the number of terms in that chain) adds to the strength of the chain.

A basic lexical chaining algorithm may be described as follows: For each noun w in the text, check to see if there exists a lexical chain c that contains a word that shares a relation with w. If so, then add word w to chain c. Otherwise, create a new lexical chain for w.

The process of automating the text skimming task may involve extracting a hierarchy of topics that may describe a text and allow a user to jump directly to passages anywhere in the text that discuss concepts of interest. Lexical chains may be used as a method of choosing topics that represent a paper. Existing lexical chain algorithms may be adapted for scientific papers.

Text skimming may attempt to simulate non-linear skimming that may be used by sighted readers. Non-linear reading may be achieved by using a table of contents, that may link titles representing a text unit (e.g., a chapter or a section) with the text it describes, and a back-of-book index (which links terms used in a text with a list of locations in the text where that term is used). A text skimming application may join these two components into an annotated table of contents.

From subroutine 210, where computing device 100 creates at least one lexical chain from an electronic document, method 200 may advance to stage 215 where computing device 100 may create a list of positions within the electronic document where at least one concept represented by one of the at least one lexical chain is mentioned.

Section titles may be extracted from a paper to create a table of contents like the one for paper, such as that shown in FIG. 4. Lexical chains may be created automatically from the paper. Each lexical chain may have a link to each location in the text that refers to that chain.

For the purposes of a text skimming application, a distinction between global chains, which may refer to key topics in a paper, and local chains, which may represent localized topics in a paper (e.g., a section) may be made. Local chains may be shown in the annotated table of contents. Global chains, which are not particular to any one section, may be presented separately, as the ones shown in FIG. 6.

A text skimming application may have two tasks. First, a set of lexical chains that together represent important topics in the text may be created. The lexical chains in this set may describe the text overall; each key topic in the document may be represented by a lexical chain, and no "spurious" lexical chains (i.e., chains not describing a recognizable topic in the document) may exist in the set. Second, a user may be presented with lexical chains that (in isolation) the user can recognize as meaningful topics.

For each section title in a table of contents that may have been created earlier, the lexical chains with the highest density in the text of that section may be displayed underneath the section title with links to sentences involving the chains. Lexical chains need not be presented in any particular order. The resulting product may be an annotated table of contents. Since each lexical chain may be used as an entry in the annotated table of contents, it may be recognizable by humans, as is an entry in a standard table of contents.

Once computing device 100 creates the list of the positions within the electronic document in stage 215, method 200 may continue to stage 220 where computing device 100 may assemble a list of positions where the at least one concept is mentioned. For example, the at least one concept may be mentioned in a particular chapter, on a particular page, within a particular figure, etc.

FIG. 7 shows a screenshot of a text skimmer when a user opens a paper. The annotated table of contents may be presented in a box on the left of the screen. Each section title from the paper may be listed. Indented under each section title may be abbreviated lexical chains that may occur in that section. The text of the paper may be reproduced in the box on the right of the screen.

If a user clicks on a lexical chain in the annotated table of contents, that lexical chain may be highlighted. Each sentence from the text containing that term may also be highlighted as shown in FIG. 8. The arrows in the top left corner of the screen may allow the user to skip from one highlighted sentence to the next. A menu option may allow a user to hear the selected text read aloud with a speech synthesizer.

After computing device 100 assembles the list of positions where the at least one concept is mentioned in stage 220, method 200 may proceed to stage 225 where computing device 100 may create an annotated table of contents. For example, in creating the annotated table of contents, computing device 100 may merge an index and a table of contents of the electronic document. An annotated table of contents may be generated by presenting each lexical chain underneath the section in which that chain occurs most frequently, such as that shown in FIG. 5.

From stage 225, where computing device 100 creates the annotated table of contents, method 200 may advance to stage 230 where computing device 100 may receive a selection of the at least one concept from the list. For example, in receiving the selection of the at least one concept from the list, computing device 100 may receive the selection from the annotated table of contents.

Once computing device 100 receives a selection of the at least one concept from the list in stage 230, method 200 may continue to stage 235 where computing device 100 may determine whether or not to hide or highlight text. For example, if computing device 100 determines that text is to be hidden, method 200 may continue to stage 240 where computing device 100 may hide text within the electronic document that is not associated with the selected concept. If computing device 100 determines that text is to be highlighted, method 200 may continue from stage 235 to stage 245 where computing device 100 may highlight text within the electronic document that is associated with the selected concept. Once computing device 100 has hidden or highlighted text, or both in stages 240 and 245, respectively, method 200 may then end at stage 250.

FIG. 7 shows a screenshot of a text skimmer when a user opens a paper. The annotated table of contents may be presented in a box on the left of the screen. Each section title from the paper may be listed. Indented under each section title may be abbreviated lexical chains that may occur in that section. The text of the paper may be reproduced in the box on the right of the screen.

If a user clicks on a lexical chain in the annotated table of contents, that lexical chain may be highlighted. Each sentence from the text containing that term may also be highlighted as shown in FIG. 8. The arrows in the top left corner of the screen may allow the user to skip from one highlighted sentence to the next. A menu option may allow a user to hear the selected text read aloud with a speech synthesizer.

Figure 3:
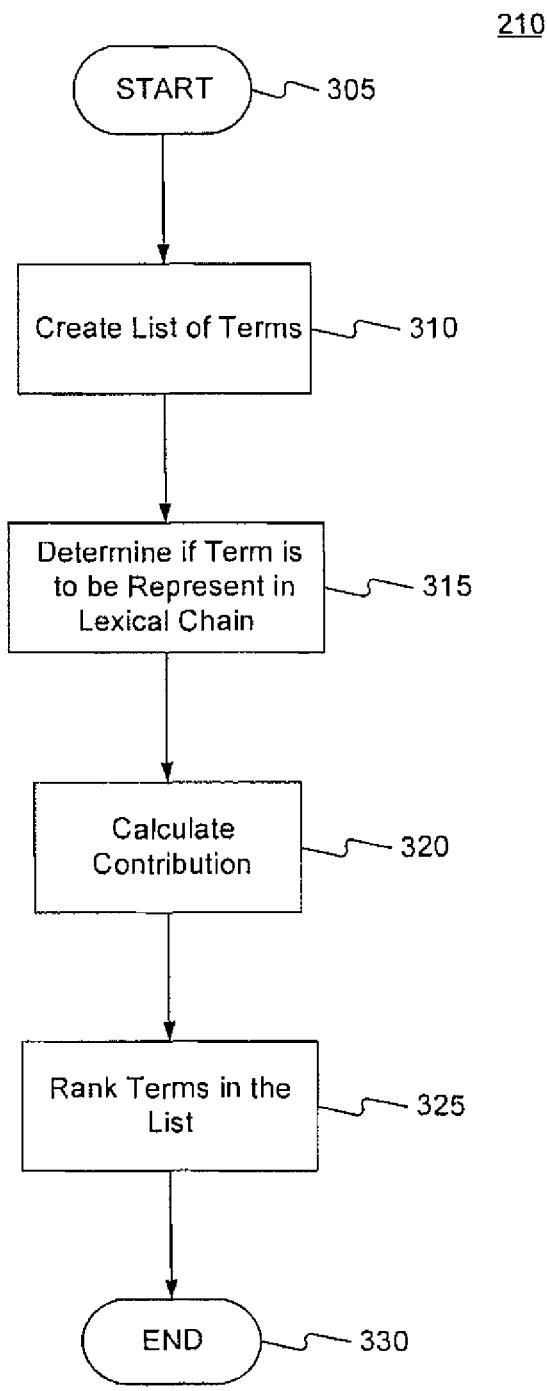
FIG. 3 is a flow chart of a subroutine used in the method of FIG. 2 for creating at least one lexical chain from an electronic document.

FIG. 3 is a flow chart setting forth the general stages involved in subroutine 210 consistent with an embodiment of the invention for creating at least one lexical chain from the electronic document. Subroutine 210 may begin at starting block 305 and proceed to stage 310 where computing device 100 may create a term list. For example, the computing device 100 may create the term list listing the terms in the at least one lexical chain.

From stage 310, where computing device 100 creates the term list, subroutine 210 may advance to stage 315 where computing device 100 may determine if the terms in the term list are to be represented in one of the at least one lexical chains. For example, computing device 100 may determine if the term corresponds to at least of the at least one lexical chains. If the term corresponds to at least one of the at least one lexical chains, then computing device 100 may add the term to the at least one of the at least one lexical chains the term corresponds to. In addition, computing device 100 may create a new lexical chain when the term does not correspond to at least one of the at least one lexical chains. Note that while computing device 100 may add the term to a lexical chain or create a new lexical chain, the term does not have to belong to a lexical chain.

Once computing device 100 determines if the terms in the term list are to be represented in one of the at least one lexical chains in stage 315, subroutine 210 may continue to stage 320 where computing device 100 may calculate a contribution for each of the terms. For example, computing device 100 may calculate a contribution that may denote a relevance of each of the terms.

After computing device 100 calculates the contribution for each term in stage 320, subroutine 210 may proceed to stage 325 where computing device 100 may rank the terms in the terms list based on the contribution. Once computing device 100 ranks the terms in the terms list in stage 325, subroutine 210 may then end at stage 330.

A lexical chain is a collection of related terms that together represent a concept or a topic, and includes terms found in the text that are related to the concept. For example the terms {morpheme, prefix, suffix, affix} form a lexical chain representing the morpheme/morphology concept. Note that the members of a chain are not necessarily only synonyms, but can be otherwise semantically related.

Each term in a lexical chain may be a single word or a string of words taken directly from the text. These may appear either alone or together. It is possible for a single chain to contain a mixture of nouns, adjectives, and adverbs. It is not the case that all nouns, adjectives, or adverbs found in the text must be part of a chain. For example, if the string "robust statistical parser" occurs in a document, the entire string could be used as a term. Alternatively or additionally, a substring like "statistical parser" could be used as a term. The words in a term need not be contiguous, so "robust parser" could also be an acceptable term.

For complex terms it may often happen that the entire term, or part of the term, will belong to more than one chain. For example, the term "confusion probability" could belong to a chain about confusion matrices and also in a chain about probability. It could also be the case that the word "probability" is taken on its own as a term.

To form a lexical chain, a lexical annotator may choose relevant terms (words or phrases) from the text based on rules. Multiple occurrences of the exact same term in the text count only once. The same term can appear in more than one chain but may not appear more than once in the same chain.

There are certain relations that can hold between words in lexical chains. Synonymy: Two terms belong to the same chain if they are synonyms in the context of the document (i.e. grammar and syntax). Meronymy (Part/whole relationship): Two terms belong to the same chain if one term is part of another in the context of the document (i.e. wolf and pack, or door and handle). Hyponymy/Hypernymy (is-a relationship): Two terms belong in the same chain if one describes a more specific version of the other (i.e. person and human). Antonymy: Two terms can belong to the same chain if they are antonyms in the context of the document (i.e. continuous and discontinuous).

An embodiment consistent with the invention may comprise a method for automatic text skimming using lexical chains. The method may comprise creating at least one lexical chain from an electronic document and creating a list of positions within the electronic document where at least one concept represented by one of the at least one lexical chain is mentioned. The method may also comprise assembling a list of the position where the at least one concept is mentioned and receiving a selection of at least one concept from the list. In response to the selection, sections of the electronic document that contain the selected at least one concept may be highlighted.

Another embodiment consistent with the invention may comprise computer-readable medium which stores a set of instructions which when executed performs a method for automatic text skimming using lexical chains. The method executed by the set of instructions may comprise creating at least one lexical chain from an electronic document and creating a list of positions within the electronic document where at least one concept represented by one of the at least one lexical chain is mentioned. The method executed by the set of instructions may further comprise assembling a positions list indicating where the at least one concept is mentioned and receiving a selection of at least one concept from the list. In response to the selection, sections of the electronic document that do not contain the selected at least one concept may be hidden.

Yet another embodiment consistent with the invention may comprise a system for automatic text skimming using lexical chains. The system may comprise a memory storage and a processing unit coupled to the memory storage. The processing unit may be operative to create at least one lexical chain from an electronic document and create a list of positions within the electronic document where at least one concept represented by one of the at least one lexical chain is mentioned. In addition, the processing unit may be further operative to assemble a list of the positions where the at least one concept is mentioned and receive a selection of at least one concept from the list.

All rights including copyrights in the code included herein are vested in and the property of the Applicant. The Applicant retains and reserves all rights in the code included herein, and grants permission to reproduce the material only in connection with reproduction of the granted patent and for no other purpose.

Lexical chains may have attractive properties. For example, each lexical chain created from a text may represent one concept discussed in the text. Lexical chains may be associated with text units (e.g., sections or paragraphs) to allow for navigation within a text. Lexical cohesion may exist in text from any text type, so the lexical chain creation process may be text type independent.

It is also possible to use WordNet as a source of additional cohesive relations. The following WordNet relations may be recognized: synonymy, hypernymy, and meronymy. Hypernymy: Word w1 is a hypernym of word w2 if w2 belongs to the class of objects described by w1. For example, tool is a hypernym of hammer. Word w1 is a meronym of w2 if w1 forms a part of w2. For example, finger is a meronym of hand.

FIG. 9 shows the five highest scoring lexical chains produced when WordNet relations are used. The chains in FIG. 9 are longer and thus have higher scores. There is also one case of WordNet introducing extra words that alter the sense of a chain; the function chain from FIG. 10 consists only of terms that share the headword function (and thus requires no WordNet relations). Allowing WordNet relations causes the words use, role, and purpose to be added. The word sense disambiguation may favor this longer chain over the function chain from FIG. 10.

The terms that may be extracted as candidates for inclusion in lexical chains are noun phrases of the form A*N+(i.e., zero or more adjectives followed by one or more nouns). Adjectives may be allowed to be considered for inclusion in lexical chains. One immediate question that may arise is which adjectives should be included in technical terms and which should be ignored.

A linguistic analysis of adjectives may be adapted to produce a computational model for ignoring adjectives that are likely to be unrepresentative of a scientific text. There may be positive effects from including some carefully chosen adjectives can have on the quality of lexical chains. Since many technical terms consist of more than two words (i.e., natural language processing), no limit needs to be placed on the number of modifiers that are used in a lexical chain term.

Lexical cohesion and lexical chain may belong to the same chain for a paper that is about lexical chains, even though cohesion and chain may share no relation. Humans may associate multi-word technical terms that share the same noun modifier (e.g., similarity function and similarity ranking). To account for this, a shared modifier relation may be added to a lexical chaining algorithm. FIG. 11 shows lexical chains generated using the shared modifier relation.

A modifier may act to select the head noun that it modifies. Two nouns modified by the same adjunct may be more likely to be related than two modifiers that modify the same head. Thus, two terms that share a modifier (e.g., using the shared modifier relation) may be more likely to be related than two terms that share a head.

Humans use adjectives when identifying terms for lexical chains. For example, the lexical chains in FIG. 12 include the scientific terms empirical distribution and conditional probability. Humans group terms together that have common modifiers. The lexical chains in FIG. 12 include the terms probability estimate and probability estimation. Although the syntactic and semantic heads of these two terms are estimate and estimation, respectively, the topic that the two terms share is probability. Therefore, both terms were selected to be in the same lexical chain as conditional probability.

Judging the similarity between two lexical chains may be an asymmetric decision. In FIG. 13, X and Y represent lexical chains and each rectangle represents a term in a lexical chain. Lines connect matching terms between the two chains. Consider a search task where, given a lexical chain from the user representing a query, relevant lexical chains from papers that may also be interesting should be found. Suppose that lexical chain X, from FIG. 13, is the "query" chain and the system finds chain Y as a potential match. Chain Y stands a good chance of being a relevant match because it contains 2/2 of the query terms, therefore, we would want the system to show us this chain. Now suppose that chain Y is the "query" chain and the system finds chain X. Chain X does not appear to be very relevant to chain Y because it only contains 2/5 of the query terms, so the system should give chain X a low score.

The corpus of scientific text used for experiments throughout this specification is the ACL Anth Corpus. ACL Anth Corpus is an XML corpus derived from the ACL Anthology, which is an archive of PDF versions of the journal. The process of converting the ACL Anthology PDF files into XML files used a process described in U.S. patent application Ser. No. 11/479,819, filed Jun. 30, 2006, which is incorporated herein by reference in its entirety.

Each lexical chain may consist of terms that form the concept corresponding to that lexical chain. Which particular terms should be chosen for a lexical chain may be one of the tasks of a lexical chainer, and which terms are characteristic may differ from text type to text type.

Technical terms are representative of technical writing. Technical terms may be primarily noun phrases composed of nouns and adjectives.

If modifiers are used compositionally with a noun phrase, then these modifiers tend not to be repeated with the noun phrase. The modifiers, however, tend to be replaced with synonyms or dropped altogether whenever the noun phrase is used again. Thus, adjectives that are part of technical terms may play a different role from adjectives not used in technical terms. An algorithm may identify certain multi-word noun phrases that are repeated in a text as candidates for technical terms. This approach may overlook technical terms that may be used only once in a paper.

Lexical chains may consist primarily of technical terms. However, lexical chains with high relevance in a paper may only occur once. Therefore, including those terms that either occur only once or comprise a single word may be necessary. For instance, a terms probability distribution and euclidean distance may be overlooked.

A plausibility rating given by human subjects may correlate significantly to co-occurrence frequency of adjective-noun pairs. This correlation, however, may overlook newly introduced (or highly specialized) technical terms that are infrequent in a corpus while still being representative of an individual paper.

For example, a term genetic algorithm may refer to a specific type of machine learning algorithm that simulates the evolutionary process. In this case the algorithm is not genetic. The term genetic algorithm would be central in characterizing a paper about this method, while the term algorithm by itself would not. The adjective genetic in this case is a characteristic adjective. However, a fast algorithm is simply an algorithm that is fast, and therefore fast algorithm is not a technical term. In this case the adjective fast does not help to characterize the term and may be called a non-characteristic adjective. Only characteristic adjectives may be included in terms, which are chosen for lexical chains. Adjectives may be frequent in technical writing. They may often occur as premodifiers in scientific text. Ignoring adjectives in various noun phrases could introduce serious deterioration in terms characterizing the topics of a paper, as demonstrated by the examples in FIG. 14.

One type of collocation is a rigid noun phrase; such a collocation typically cannot be shortened without losing its meaning. Rigid noun phrases may represent important concepts in a particular domain (e.g., Dow Jones industrials and Dow Jones industrial average). The head nouns industrials and average do not share a semantic relation. The technical terms Dow Jones industrials and Dow Jones industrial average are related by the shared modifiers Dow Jones.

While some adjectives cannot be removed from scientific terms without changing the basic meaning, or sense, of the terms, some adjectives do not contribute technical information and thus may be removed without losing the representative value of the term. For example, removing genetic from genetic algorithm would result in a different term while removing fast from fast algorithm would not. The roles of particular adjectives may depend on the domain. The distinction is not merely a consequence of writing style or word distribution, but rather, that there is a difference in usage between characteristic and non-characteristic adjectives.

Non-characteristic adjectives may be recognized automatically based on their usage. A system for finding non-characteristic adjectives is a clear improvement over a stop-list, as it is adaptable to specific domains. For example, the system should reject adjectives in column 1 of FIG. 15 while keeping the adjectives in column 2.

A simplifying assumption is that the contexts in which an adjective is either non-characteristic or characteristic are genre-specific. That is, within one genre, it may be assumed that an adjective is almost always either non-characteristic or characteristic, independent of the noun context. Note however, this is only an assumption and there are cases where an adjective is both non-characteristic and characteristic in the same genre (e.g., both musical clock and musical criticism might occur in the same genre), but such cases are rare.

Gradability (henceforth called the Gradability property) is that degree adverbs (e.g., very and too) do not modify characteristic adjectives. This is in analogy with nouns, which also cannot follow a degree adverb without producing ungrammatical phrases.

Conjunction of like constituents observation (henceforth called the Conjunction property) is that two constituents of different types can be conjoined only if they are derived from the same type. Nouns can be conjoined with characteristic adjectives, but cannot be conjoined with non-characteristic adjectives.

In analogy, characteristic adjectives can conjoin with other characteristic adjectives, and non-characteristic adjectives can conjoin with other non-characteristic adjectives. However, they should not mix.

Nominalization (henceforth called the Nominalization property) states that characteristic adjectives are not nominalized. Like nouns, which are already nominals, characteristic adjectives possess a nominal property because they share the same derivational origins as nouns. The ability of an adjective to be nominalized can be predicted by its ability to be used as a predicate, and, thus, non-characteristic adjectives can be nominalized.

Since an adjective's classification as characteristic or non-characteristic may depend heavily on usage, the process for building adjective filters may be data-driven. The adjective filter may be trained on a large corpus, and the results may be stored so that the adjective tests do not have to be run again during a lexical chaining process.

Each adjective test may assign to each adjective type in the corpus a score representing the degree of "non-characteristic-ness" of that adjective. This may be done for each test by analyzing each token of an adjective and incrementing the non-characteristic-ness score of the adjective type by one if the token under consideration is deemed to be non-characteristic by the test. For example, consider the sentence "The grass is green." The Predication test would deem the above token of green to be non-characteristic because it directly follows a copula verb. In this case the non-characteristic-ness score for the adjective type green would be increased by a predetermined value such as 1.

Because each test is making a "fuzzy" decision based on frequency, the results of one test alone do not have to be relied upon. In addition, no test may "veto" any other test. One problem with relying on one property over the others is that the number of adjective tokens that qualify for one given test may be low. For example, the Predication test can only consider adjective occurrences that follow a copula verb. To avoid this problem the results of all adjective tests may be combined. This has the benefit of maximizing the number of tokens that are evaluated.

The adjective tests used in a filter may be compatible. That is, if tests $T_1$ and $T_2$ independently make similar judgments about the classification of adjectives, then the results of one test may be reinforced by the other.

Since the process of deciding whether an adjective is characteristic or non-characteristic is independent of the context of the test data, it is possible for an input text to contain an adjective (already deemed to be characteristic) that is used in such a way as to be deemed non-characteristic by one of the adjective tests. For this reason it is important to train the adjective filter on a corpus of text that is in the same domain as the test data. This is based on an assumption that an adjective's characteristic-ness remains the same within the genre. The output of running the adjective tests on a training corpus is a database containing statistics describing each adjective's performance on each test.

The Predication test may determine the ability of an adjective to occur in a predicative construction. This test may be performed by searching the training corpus for adjectives that are preceded by a copula verb (e.g., is, are, etc.). If a token of an adjective is found to follow a copula verb and it is not part of a noun phrase, then the non-characteristic-ness score for that adjective type is increased by a preset value such as 1.

Once this test has been performed over the entire training corpus, each adjective type may be assigned a Predication score. This score may be the ratio of the Predication non-characteristic-ness score for the adjective to the total frequency of the adjective. FIG. 16 shows some adjectives taken from the ACL Anth Corpus along with results from the Predication test.

The Gradability test uses the Gradability property, which states that non-predicating adjectives cannot take degree adverbials as premodifiers. A token of an adjective is deemed to be non-characteristic by this test if that token is found to be immediately preceded by a degree adverbial in the training corpus. In such a case, the Gradability non-characteristic-ness score for the adjective type is increased by a preset value such as 1.

Once a test has been performed over the entire training corpus, each adjective type may be assigned a Gradability score. This score may be a ratio of the Gradability non-characteristic-ness score for the adjective to the total frequency of the adjective. FIG. 17 shows some adjectives taken from the ACL Anth Corpus along with the results from the Gradability test.

As evidenced from the previous examples, the scores produced by the Predication test and the Gradability test may differ but the classification of adjectives as characteristic or non-characteristic may be similar. Despite this similarity, they are not identical. For example, the adjective related was deemed to be non-characteristic by the Gradability test 17.5% of the time. However, it only deemed to be non-characteristic by the Predication test 0.4% of the time, making it characteristic overall. This indicates that of all occurrences of the adjective related in the corpus, only 0.4% of them followed a copula verb. The absence of examples of an adjective being non-characteristic by a particular test does not mean that it could not be deemed non-characteristic by that test given a larger corpus.

The Conjunction test uses the Conjunction property which states that only like constituents can be used together in a conjunction. In particular, non-characteristic and characteristic adjectives cannot conjoin. The Conjunction test is different from the tests described above because it cannot be performed until the status (non-characteristic or characteristic) of both adjectives in the conjunction are known. Therefore, the Conjunction test cannot be executed during the same processing stage as the other two tests. Instead, it relies on the output of the Predication test and the Gradability test.

Given an adjective token that is used in an adjective conjunction, if that adjective has already been deemed to be non-characteristic by the other two tests then the conjoining adjective is deemed to be non-characteristic by the Conjunction test. In such a case the non-characteristic-ness score for the adjective type is increased by a predetermined value such as 1.

Unlike the Predication test and the Gradability test, the non-characteristic-ness scores produced by the Conjunction test do not clearly separate the adjectives into characteristic adjectives and non-characteristic adjectives, as FIG. 18 shows.

The Conjunction test considers the adjective relevant to be characteristic based on its low non-characteristic-ness score, while the other two tests deemed it to be non-characteristic (which is more in line with intuition). One reason for this is that the fuzzy decision made by the Conjunction test is based on fuzzy decisions made by other rules. Also, the frequency of adjective conjunctions is small so there are not many data samples.

Given an adjective type A, the final non-characteristic-ness score is computed from the individual non-characteristic-ness scores with the following formula:

$$nc(A) = \frac{p(A) + g(A)}{f(A)}$$

where p(A) is the Predication non-characteristic-ness score for A, g(A) is the Gradability non-characteristic-ness score for A, and f(A) is the frequency of A in the training corpus.

Characteristic adjectives are identified using a threshold X. All adjectives with final scores less than X are identified as characteristic while all others are identified as non-characteristic. For example, the threshold X for the ACL Anth Corpus was set as 3% by manually inspecting the list of all adjectives in the corpus. This means that, in order for an adjective to be characteristic, no more than 3% of the occurrences of that adjective may be deemed to be non-characteristic by the adjective tests. FIG. 19 lists the 152 most characteristic adjectives as scored by the adjective filter.

Note that all adjectives presented in FIG. 19 are strings that were tagged as adjectives by a part-of-speech tagger. The first entry in the list is "ith" and is used in texts in the context of specifying an index (e.g. "take the ith element"). The adjective filter does not remove non-adjectives; given the information that a string is an adjective, it computes how characteristic the adjective is based on its usage.

When porting the adjective filter to a different domain, the threshold could be changed. Language use varies across domains and across writing styles within the same domain, and an adjective can be non-characteristic in one context (e.g., nervous applicant) and characteristic in another (e.g., nervous disorder). The threshold used in determining the boundary between characteristic adjectives and non-characteristic adjectives may differ from domain to domain. This is because the distribution of adjectives (i.e. which adjectives are used and at what frequency they are used) varies with the style and subject of the corpus.

A lexical chain is not a coherent piece of text, so a lexical chain is more difficult to read than a sentence or a summary. Good lexical chains may be defined by chains that are similar to human-generated lexical chains. The quality of automatically-generated lexical chains may be measured based on the agreement between these chains and the human-generated lexical chains. Not every lexical chain created by one annotator has to match a chain created by another annotator.

The following properties may be used for a lexical chain similarity measure:
1. Missing terms: If a lexical chain (representing a topic) misses terms present in another lexical chain, then the match should be penalized.
2. Superfluous terms: If a lexical chain (representing a topic) contains terms not present in another lexical chain, then the match should also be penalized.
3. Term similarity: A similarity measure should be sensitive to types of similarity other than strict term identity; it should identify chains in different documents that refer to the same (or a similar) topic even if the terms used in the chains differ.

The purpose of this annotation task is for an annotator to manually define a set of lexical chains which sufficiently describes the important points and purposes of a document.

Multiword terms may play an important role in scientific text. Thus, comparing lexical chains is not a trivial task. A "good" lexical chain may be an automatically-generated lexical chain that may be similar to lexical chains in a gold standard of human-generated chains. Good lexical chains are then by definition chains that are similar to human-generated lexical chains. The term "chain-set" to denote a collection of lexical chains that describe one text document (e.g., a scientific paper or a news story).

Operation Example

In an operation example, two papers from the ACL Anth Corpus to construct the gold standard are:
- $P_1$ Lillian Lee (1999). "Measures of Distributional Similarity". *Proceedings of the 37th Annual Meeting of the Association for Computational Linguistics.*
- $P_2$ Barbara Di Eugenio, Pamela W. Jordan, Johanna D. Moore, and Richmond H. Thomason (1998). "An Empirical Investigation of Proposals in Collaborative Dialogues". *Proceedings of the 36th Annual Meeting of the Association for Computational Linguistics and 17th International Conference on Computational Linguistics.*

Lexical chains from 13 annotators (referred to as annotators A-M) were collected. These lexical chains comprise 6 chain sets for paper $P_1$ and 7 chain sets for paper $P_2$, with two human subjects providing chains for each paper. Annotators A and I are the same person and annotators F and M are the same person. The task took each person roughly two hours to complete.

Each annotator was given a set of materials as described below, and was given unrestricted time to create lexical chains describing the paper (i.e., sets of terms that they judged to be related given the context of the paper). The guidelines (presented above) are essentially as follows:
- There were no limits placed on the size of lexical chains or the number of chains needed to describe a document.
- A term can comprise a single word or a combination of words, and must be taken directly from the text. Words used in terms may be nouns, adjectives, or adverbs. Possible relationships between terms in a chain are mentioned which include inflectional variance, synonymy, hypernymy/hyponymy, holonymy, and meronymy.
- Each subject that created lexical chains from a paper was given a printed copy of the paper as well as an electronic copy in PDF form. Subjects were given the option of either performing the task using the paper copy and marking or writing their lexical chains, or performing the task online and typing their lexical chains.
- Extra materials were additionally given to the subjects (in printed and electronic formats). These included: 1) a list of all words in the paper together with part-of-speech tags generated by a tagger provided with the RASP system, 2) an XML version of the paper in which each sentence was given a unique identifier, and 3) a list of non-recursive noun phrases automatically extracted from the paper together with, for each noun phrase, a list of all sentences (using the XML IDs mentioned above) containing that noun phrase.
- It was explained that the use of these extra materials was optional. They were included to provide more information about the frequency and distribution of words and noun phrases that may or may not be useful to an annotator in determining to which lexical chain (if any) a word or noun phrase should belong.

The Lexical Chain Gold Standard contains 230 lexical chains (106 for Paper $P_1$ and 124 for Paper $P_2$). There is a variation in the numbers of chains created by the annotators (as shown in FIG. 20) and in the numbers of terms used in the lexical chain (as shown in FIG. 21). Note that the variation in number of chains is considerable, ranging from 4 to 27 for paper $P_1$ and from 7 to 35 for paper $P_2$. The average length of chains per annotator ranges from just under 3 terms to just over 16 terms. Despite this seemingly large variation, in the 13 chain sets there are 9 chains having an identical copy in a different chain set. FIGS. 22 and 23 show identical lexical chains by different annotators for papers $P_1$ and $P_2$, respectively.

Human-generated lexical chain data show that humans tend to include adjectives when creating lexical chains for scientific text. FIG. 24 shows, for each of papers $P_1$ and $P_2$, the percentage of human-generated lexical chains that contain one or more terms involving an adjective (columns 2 and 5) and the percentage of human-generated terms that involve one or more adjectives (columns 3 and 5). Each annotator included one or more adjectives in at least half of their lexical chains and in at least 18.7% of their terms.

FIGS. 25 and 26 give examples of all adjectives used by annotators for paper $P_1$. Column 1 shows, for each adjective, an example of a term using that adjective included in a lexical chain by at least one of the annotators. Columns 2-7 indicate which of the annotators used the adjective in column 1 (not necessarily in the same term). We can see from these figures that humans not only use many adjectives, but that there is also considerable overlap in the adjectives that they use.

FIG. 27 shows adjectives used by humans from paper $P_1$ that were deemed to be characteristic by adjective tests. FIG. 28 shows adjectives used by humans with a non-characteristic-ness score just above the characteristic-ness threshold of 3% mentioned above (i.e., adjectives that would have been identified as characteristic using a slightly higher threshold). Recall that the output of the adjective filter for each adjective is a non-characteristic-ness score; thus the characteristic adjectives have the lowest scores.

As seen in the data, some annotators used more adjectives than others. There were adjectives used by at least one annotator that were assigned high non-characteristicness scores by filters, such as the ones shown in FIG. 29.

As described above, earlier lexical chainers have allowed two terms to be included in the same lexical chain if they shared a head. This 'shared head' relation accounts for 13.3% of relations between all pairs of terms in the same lexical chain created by the human annotators from paper $P_1$. It accounts for 5.5% of such relations from paper $P_2$. FIG. 30 shows some human-generated lexical chains comprising terms that share the same head.

The data show that humans also add to the same lexical chain complex terms that share the same modifier (e.g., similarity measure and similarity function). In fact this 'shared modifier relation' accounts for an additional 10.5% of term relations from paper $P_1$ and 1.2% of term relations from paper $P_2$. The human-generated chains in FIG. 31 involve pairs of terms that are 1) not in WordNet, 2) do not share the same head noun, and 3) share the same modifier.

There are many intuitively similar chains among those by the different annotators. The four chains in FIG. 32 differ in length and exact term use, but they all refer roughly to the concept of similarity measures.

Since it is not clear whether a comparison of two lexical chains should involve type counts or token counts or both, comparing two chains is not necessarily equivalent to comparing two bags of words. How to compare the "sizes" of two lexical chains is not obvious since it is not clear how to measure the "size of a chain. In addition to the type/token question, comparing the contents of two lexical chains is even harder because two complex terms in the same lexical chain may share parts of the terms (e.g., single words), or a part of one term may also be a term on its own. This leads to a conflict between set comparison on full terms and comparison of atomic term parts (i.e., words). Twelve different similarity measures may be evaluated and compared.

The quality of automatically-generated lexical chains is measured based on the agreement between these chains and the human-generated lexical chains in the Human Gold Standard. FIG. 33 gives examples of two human-generated lexical chains created by the same annotator for two different concepts in the same text. Both chains share some of the same words but do not represent the same concept. In this example, the intersection of chains C7 and C15 comprises the three words base language model. This intersection accounts for 60% of the words in chain C7 and 37.5% of the words in chain C15 (cf., FIG. 3.13). Although it seems intuitive that chain C7 is related to language modelling while chain C15 is more related to probability, finding a similarity measure to successfully characterize these lexical chains as different is not trivial.

Determining the similarity between two lexical chains is a difficult task for the following reasons:
1. Partial chain overlap: Lexical chains can share some terms and not others.
2. Differing lengths: Different lexical chains may have different lengths. This can pose a problem when using some traditional set metrics which are sensitive to differences in set size.
3. Partial term overlap: Terms can be similar without being identical. For example, cooccurrence probability and conditional cooccurrence probability partially overlap and should probably be identified as matching terms.
4. Types or tokens: Chain length can be calculated based on the number of term types in the chain or by the number of term tokens.

Therefore a priori is needed before an intuitive definition of lexical chain similarity, so that the measure which performs closest to that intuition can be selected. A good lexical chain similarity measure should be able to make similarity judgments distinguishing those chains that are very different from a comparison chain from those which are similar. It should also be able to make fine distinctions between similar lexical chains. To quantify similarity between lexical chains in the human-generated collection, two gold standards of similarity judgments were created.

A gold standard is referred to as coarse because each chain was compared against all of the chains from another annotator's chain set, so that at most one or two lexical chains can be expected to match at all. The comparisons were made using four chain sets (for paper $P_1$ from annotators A, B, C, and D).

For each pair of annotators $\alpha_1$ and $\alpha_2$, a manual comparison between each lexical chain from $\alpha_1$ with all chains from $\alpha_2$ was made. For each chain $\gamma$ in $\alpha_1$, the chain in $\alpha_2$ that most closely matched $\lambda$ was identified. If no chain in $\alpha_2$ was similar to $\gamma$, then it was recorded that $\lambda$ had no match in $\alpha_2$. The same process was used to compare each chain in $\alpha_2$ with all chains in $\alpha_1$.

FIG. 34 illustrates an example of a comparison of lexical chains created by annotator A to those created by annotator B. The table shows that of all of the chains created by annotator B, the chain that A1 overlaps the most is B7, and the chain that A2 overlaps the most is B8. Similarly, I compared the chains created by annotator B to those created by annotator A by doing a reverse comparison. Doing this for all four annotators resulted in 12 sets of comparisons (246 individual comparisons). Note that the comparisons need not be symmetric. For example, the chain created by annotator B judged to be the best match to chain A6 is chain B2. However, the chain created by annotator A that was judged to be the best match to chain B2 is chain A10.

Not every lexical chain created by one annotator will match a chain created by another annotator. While there seems to be widespread agreement about the global topics in a document (e.g., each annotator for Paper $P_1$ created a lexical chain related to similarity measures), there is less agreement about local topics that are discussed in sections or subsections such as a chain related to training corpora. For example, 13 lexical chains have exactly one match among the other annotators, and 11 chains do not match any of the other chains. An example of a lexical chain created by one annotator that had no matches from any of the other annotators is Chain £>16:

Since four annotators were used in creating the gold standard for the coarse-grained comparison data, each lexical chain for a given annotator is compared with three other sets of chains. This means that each lexical chain has up to three matches that should be expected to be similar (one match for each of the other three annotators).

For each lexical chain, the most similar chain from the (up to) three matching chains from the other annotators were chosen. FIG. 35 shows, for each chain from annotator A, the chains from the other annotators that were chosen in the Coarse gold standard as the best matches. Asterisks mark chains for the Fine gold standard as the best match for annotator A out of all corresponding chains in the Coarse gold standard. Thus the Coarse gold standard was a precondition for the Fine gold standard.

Chains that were judged to have no matches or exactly one match in the Coarse Gold Standard were not used in the Fine Gold Standard, as no choice was possible in these cases. FIG. 36 shows the statistics of how many choices of matches (out of the possible three) there were in the fine comparison (i.e., 58 cases were available for the gold standard).

Two possible gold standards of lexical chain similarity judgments are:
1. Coarse Gold Standard: This consists of human judgments of the similarity between lexical chains created by different annotators. It represents a "coarse" comparison because for each lexical chain c created by some annotator a, the best matching chain for c created by a different annotator β is chosen from all chains from annotator β (many of which may be unrelated).
2. Fine Gold Standard: This gold standard contains, for each lexical chain c in the Coarse Gold Standard, the lexical chain judged to be the most similar to c among the (up to three) lexical chains already judged to be similar to c. This comparison is called "fine" because it makes finer judgements of similarity between similar lexical chains.

The following may be desired properties for a lexical chain similarity measure:
1. Missing terms: If a lexical chain (representing a topic) misses terms present in another lexical chain, then the match should be penalized.
2. Superfluous terms: If a lexical chain (representing a topic) contains terms not present in another lexical chain, then the match should also be penalized.
3. Term similarity: A similarity measure should be sensitive to types of similarity other than strict term identity; it should identify chains in different documents that refer to the same (or a similar) topic even if the terms used in the chains differ.

It is reasonable to consider similarity metrics for comparing sets, as lexical chains can be seen as sets of terms. Four standard similarity metrics that are used in Information Retrieval are the Dice Coefficient, Jaccard's Coefficient, the Overlap metric, and the Cosine metric. Each of these metrics takes two sets as input and produces a number between 0 (for disjoint sets) and 1 (for identical sets). They are defined as follows (where A∪B denotes the union of A and B, A∩B denotes the intersection of A and B, and |A| denotes the number of elements in A):

1. Dice Coefficient $D(X, Y) = \frac{2|X \cap Y|}{|X| + |Y|}$

2. Jaccard's Coefficient $J(X, Y) = \frac{|X \cap Y|}{|X \cup Y|}$

3. Overlap Metric $O(X, Y) = \frac{|X \cap Y|}{\min(|X|, |Y|)}$

4. Cosine Metric $C(X, Y) = \frac{|X \cap Y|}{\sqrt{|X||Y|}}$

All four metrics above for comparing sets X and Y are based on the number of elements in the intersection (i.e., |X∩Y|). The metrics differ from each other in their normalization. The intersection of X and Y is the set of elements that are contained in both X and Y. We can see, therefore, that 0≤|X∩Y|≤min(|X|, |Y|). In order to form a metric that produces values between 0 and 1, |X∩Y| is normalized by something greater than or equal to min(|X|, |Y|).

All four metrics above use different normalizations and produce slightly different scores when comparing two sets. For instance, suppose that all of the elements in X are also contained in Y and that Y is much larger than X (containing several elements not in X). The Overlap metric ignores the size of Y (normalizing by |X|), and thus produces a higher comparison score for X and Y than the Dice coefficient (which normalizes by |X|+|Y|). In fact, when Y is larger than X (and their intersection is not empty), the Overlap metric produces a higher similarity score between X and Y than any of the other metrics. Although such differences can be seen from the formulae above, it is not immediately intuitive which metric is the most suited for comparing lexical chains.

The first class of similarity measures that I consider is the Type-based class. The type length of a lexical chain X (denoted $|X|_t$) is the number of term types contained in the chain (type-based set operations are denoted with a subscript t.).

The type-based intersection of two chains X and Y, denoted by $X \cap_t Y$, is defined as the collection of all term types which belong to both chain X and chain Y. The type-based union, denoted by, $\cup_t$ is defined similarly. All four type-based metrics and their formulae are presented here:

| Metric | Formula |
| --- | --- |
| TD(Dice) | $\frac{2|X \cap_t Y|_t}{|X|_t + |Y|_t}$ |
| TJ(Jaccard) | $\frac{|X \cap_t Y|_t}{|X \cup_t Y|_t}$ |
| TO(Overlap) | $\frac{|X \cap_t Y|_t}{\min(|X|_t, |Y|_t)}$ |
| TC(Cosine) | $\frac{|X \cap_t Y|_t}{\sqrt{|X|_t|Y|_t}}$ |

The second class of similarity measures considered is the Token-based class. The token length of a lexical chain X is the number of term tokens in X and is denoted $|X|_f$. The intersection of two chains X and with respect to token frequency is defined, denoted by $X \cap_f Y$, as the collection of all term tokens that belong to both chain X and chain Y. The token-based union, denoted by $\cup_f$ is defined in a similar way. All four token-based metrics and their formulae are presented here:

| Metric | Formula |
| --- | --- |
| FD | $\frac{2|X \cap_f Y|_f}{|X|_f + |Y|_f}$ |
| FJ | $\frac{|X \cap_f Y|_f}{|X \cup_f Y|_f}$ |
| FO | $\frac{|X \cap_f Y|_f}{\min(|X|_f, |Y|_f)}$ |
| FC | $\frac{|X \cap_f Y|_f}{\sqrt{|X|_f|Y|_f}}$ |

The type-based approach has the advantage of not overweighting a small chain (e.g., one with two words) that may not contribute much conceptually to a document but contains a frequently used word. For example, the following lexical chain from paper $P_1$ has a type length of 5 but a token length of 12:

similarity metric (5), metric (3), cosine metric (2), type metric (1), value difference metric (1)

The above chain describes a key topic in paper $P_1$ (i.e. similarity metric). However, the following chain has a higher token length (18) and describes a topic that is not central to paper $P_1$.

divergence (17), total divergence (1)

To reward overlap between chains, while taking into account which (of two chains being compared) is used as the basis of the comparison (or "search"), the Overlap metric is modified as follows to arrive at the asymmetric Partial Overlap measure:

$$P(X, Y) = \frac{|X \cap Y|}{|X|}.$$

As seen, P(X, X)=1, and P(X, Y)=0 when X and Y are disjoint. Otherwise, 0<P<1. Also P(X,Y)=P(Y,X) only when |X|=|Y|, in which case P is equivalent to the Overlap metric presented earlier.

P is used to produce the following additional measures, where 0≤λ≤1:

| Metric | Formula |
| --- | --- |
| PD | $\lambda \frac{2|X \cap_t Y|_t}{|X|_t + |Y|_t} + (1 - \lambda) \frac{|X \cap_t Y|_t}{|X|_t}$ |
| PJ | $\lambda \frac{|X \cap_t Y|_t}{|X \cup_t Y|_t} + (1 - \lambda) \frac{|X \cap_t Y|_t}{|X|_t}$ |

-continued

| Metric | Formula |
|---|---|
| PO | $\lambda \dfrac{|X \cap_t Y|_t}{\min(|X|_t, |Y|_t)} + (1-\lambda)\dfrac{|X \cap_t Y|_t}{|X|_t}$ |
| PC | $\lambda \dfrac{|X \cap_t Y|_t}{\sqrt{|X|_t |Y|_t}} + (1-\lambda)\dfrac{|X \cap_t Y|_t}{|X|_t}$ |

Each class above can be divided into the following two subclasses:

1. Term Identity. A term $T_1$ in one lexical chain is considered to match a term $T_2$ in another lexical chain only if $T_1$ and $T_2$ are identical. This comparison is a binary decision; two chains sharing a multi-word term are not considered to be more of a match than two chains sharing a single-word term).

2. Partial Term Overlap: Two (non-identical) terms that have a word, or multiple adjacent words, in common are considered to be a partial match. The strength of this match varies with the number of adjacent words that they share.

This produces four kinds of lexical chain similarity measures, shown in FIG. 27. Note that it is possible to implement a token version of the Partial Overlap measures. The three classes of measures considered are: 1) type-based with term identity (metrics), 2) token-based with term identity (metrics), and 3) type-based with partial term overlap (asymmetric).

For each similarity measure, the scores are used to choose the best match (match with the highest similarity score) for each comparison. For example, according to the TD measure the best match for chain AI among annotator-B's chains is chain BI with a score of 33.3 while the best match according to the TO measure is chain 512 with a score of 50.

In analogy to the creation of the two types of similarity gold standards, the similarity measures are evaluated based on the following two tasks:

1. Given a lexical chain C and a chain set S, find the chain in S that best matches C (if a match exists). This decision is executed for each chain in a chain set. In this task each chain from one annotator is compared with a chain set from another annotator. The automatic matches are compared to the Coarse Gold Standard data described in Section 6.3.1.

2. Given a chain and a set of up to 3 similar chains, the measures are to determine the best match, or report no match (if they believe that there is no match). The automatic matches are then compared to the Fine Gold Standard and graded as correct or incorrect.

An automatic comparison measure must be capable of deciding between matches and non-matches. Given any pair of lexical chains, the measures presented here will always return a numerical score, which is sometimes but rarely zero. However, it is not the case that human-judged non-matches all correspond to zero values. In fact a score of 0.1 is most definitely not a match, although it is unclear what should happen in the case of 0.3. This decision is therefore made using a score threshold If a metric returns a score less than $\xi$ for any pair of chains, that pair is deemed not to be a match. The results that follow were obtained using the value $\xi=0.25$.

For each comparison involving a lexical chain c, there are five possibilities:

1. The human and the machine chose the same match for chain c.
2. The human and the machine chose different matches for chain c.
3. The human and the machine both judged chain c not to have a match.
4. The human judged chain c not to have a match, but the machine found a match for c.
5. The human found a match for chain c, but the machine did not.

The Precision and Recall metrics from Information Retrieval are used to evaluate the performance of the lexical chain similarity measures. To compute Precision and Recall, three numbers are computed:

1. Agree: The number of times the system agreed with the human (corresponding to cases 1 and 3 above).
2. Disagree: The number of times the system and the human did not agree (cases 2, 4, and 5 above).
3. Incorrect Returned: The number of times the system disagreed with the human and the system found a positive match (cases 2 and 4 above).

Precision, Recall, and F-measure are then defined as follows:

$$\text{Precision} = \frac{\text{Agree}}{\text{Agree} + \text{IncorrectReturned}}.$$

$$\text{Recall} = \frac{\text{Agree}}{\text{Agree} + \text{Disagree}}.$$

$$F = \frac{2 \times \text{Precision} \times \text{Recall}}{\text{Precision} + \text{Recall}}.$$

The two comparison types described above are used to evaluate the ability of each similarity measure to make the same similarity judgments (when comparing lexical chains) as a human. Moreover, they do not measure the overall similarity between two sets of lexical chains.

FIG. 37 shows examples of similarity scores produced by the type-based metrics.

From FIG. 38 it can be seen that all of the measures (and the human gold standard) agree some of the time on which chains are determined to be best matches (the obvious cases). As FIG. 39 shows, there are also disagreements between the measures. For example, the TD (Dice) and TJ (Jaccard) metrics chose chain B1 as the best match for chain A3 while the TO (Overlap) metric and the TC (cosine) metric chose chain B26 as the best match.

Chain A in FIG. 40, for example, is one such chain involved in a disagreement between measures. Since chain A3 is the only chain from annotator A that contains the word distance (and no chain from annotator A contains the word euclidean) it is the only chain to overlap chain B26, though it is a very weak match. Conversely, since chain B26 only consists of two terms, both of which refer to distance, chain A3 overlaps B26 more completely than it overlaps any other chain. This overlap-based decision was made by TO and TC (Cosine). However TD and TJ chose chain B1 as the best match for chain A3 because they share two terms, namely distributional similarity and similarity-based.

In another case, chains A1 and B1 (shown in FIG. 41) share 3 term types (i.e., distributional similarity measure, similarity function, and similarity metric). Chains AI and B12 only share one term type (i.e., divergence). However, the term divergence has a frequency of 14 in paper $P_1$.

The type-based version of the Overlap metric also chose B12 as a match for AI. The reason for this can be seen from the definition of the Overlap metric. Since the denominator is the minimum of the lengths of the two chains being compared, the Overlap of AI with B12 (producing a denominator of 2) produces a higher score than the Overlap of AI with B1 (producing a denominator of 9).

FIG. 42 shows the coarse comparison results for the 12 similarity measures. The cosine metric gives the highest performance when term types are counted rather than tokens. FIG. 42 also shows the 2-way comparison results for the token-based metrics. The Jaccard Coefficient yields the highest performance when token frequency is considered.

As seen in FIG. 42 all of the type-based metrics performed better than the highest performing token-based metric. Each score produced by comparing two lexical chains c and d using the token-based metrics is influenced by the frequencies of all terms that c and d share. This leads to incorrect choices when (for example) two chains representing dissimilar concepts share a high-frequency term. This is the case with chain B26 in FIG. 40. Chain B26 was chosen as the best match for chain A3 by all four token-based metrics because 50% of chain B26 is contained in chain A3. However, chain BI was chosen as the best match for chain A3 by two of the type-based metrics because 2 of the term types used in chain BI are used in chain A3, compared to only 1 in chain B26. Doing the reverse comparison, chain A3 was chosen by a human as the best match (from annotator A) for chain B26.

FIG. 42 also shows the Coarse Comparison results for the Partial term overlap measures using a weighting coefficient of $\lambda=0.5$. The PC (Cosine) measure gives the best performance. In fact, all of the Partial term overlap measures perform better than the highest performing type-based metric.

There is overlap in the concepts described by chain A3 and chain BI; they both describe aspects of similarity. However, chain A3 overlaps chain B26 more than it overlaps chain BI since the concept of distance described by chain B26 is contained in chain A3. According to the Coarse Gold Standard data, the chain from annotator A that best matches chain B1 is chain AI.

In this case annotator A has created two lexical chains whose concepts overlap, namely chain A1 and A3. If annotator A had not created chain A3 then the issue encountered in FIG. 40 would not have happened. If annotator A had not created chain AI, then chain A3 would still have been judged to overlap chain B26 more than it overlaps chain B1. This is because the manual judgments in the Coarse and Fine Gold Standards were done independent of all other judgments (i.e., not taking into account previous matches).

FIG. 43 shows the fine comparison results for the 12 similarity measures. In this comparison, the PJ and PC measures received the same F-Measure of 81.9%, outperforming all other measures. Since the PC measure received the highest F-Measure in the Coarse comparison (outperforming PJ), only the PC measure in the similarity experiments will be used (discussed further below).

Generally, the evaluations of the measures were based on two tasks:
1. Use each measure to find the best match for a lexical chain given several different chains from one chain set. The candidate matches may refer to similar concepts or to completely irrelevant concepts.
2. Use each measure to find the best match for a lexical chain given multiple chains that were already judged by a human to be similar. This task is harder than the previous task and thus rewards measures that are able to scrutinize the chains more closely.

The similarity measure that achieved the highest F-measure for the Coarse comparison is the Cosine metric with the Partial Overlap measure (PC). This measure tied with the Jaccard metric together with the Partial Overlap measure (PJ) in the Fine comparison.

The PC measure from above is used to evaluate the nine lexical chaining algorithms introduced above using two experiments. As motivated above, the text skimming task application has the following two tasks:
1. Automatically generate a set of lexical chains from a paper such that 1) each key topic discussed in the paper is represented by a lexical chain, and 2) each lexical chain represents an important topic in the paper (i.e., no "spurious chains"). This task takes into account the interrelationship between lexical chains in the same chain set.
2. Create lexical chains that can be recognized individually by humans as representing a topic in a paper. This task is concerned with the quality of lexical chains in isolation.

For each set of human-generated lexical chains (containing n chains for some n>0), these chains are compared against n chains from a set of automatically-generated lexical chains. The methodologies for the two experiments presented here differ only in the way that a subset of lexical chains are chosen from the entire set of automatically-generated lexical chains.

The first lexical chain comparison is performed as follows: For each set of human-generated lexical chains (having n chains), and for each of the nine lexical chaining algorithms, the n strongest lexical chains created by the lexical chain algorithm are automatically select. The strength of each chain is determined by its score as described above. This method for selecting the "best" n lexical chains from a (potentially large) set of automatically-generated lexical chains corresponds to Task 1 described above.

By comparing the strongest lexical chains as judged by the lexical chainer, this comparison not only evaluates the quality of the lexical chains that are created but it also provides the basis of an evaluation of the lexical chainer's ability to identify the strongest lexical chains. This is because an algorithm is penalized if a human creates a lexical chain for a topic that does not correspond to a lexical chain selected by the lexical chainer (even if such a chain was created but was not one of the n strongest chains).

The goal of Task 2, as described above, is to create high quality lexical chains that can be read and interpreted by humans. This task is not concerned with choosing the "right" number of lexical chains in a set, but rather focuses on lexical chains in isolation. To take this into account, the second lexical chain comparison is performed in the following way: For each set of human-generated lexical chains (having n chains), and for each of the nine lexical chain algorithms, the n automatically-generated lexical chains (using the PC similarity measure from above) that most closely match the n human-generated chains are automatically selected.

This approach has the advantage of not penalizing a lexical chain algorithm for generating more chains than a human but has the obvious drawback of requiring human input in order to choose the "best" lexical chains as output. Therefore, while this is a suitable evaluation of the quality of lexical chains in isolation, this system is not fully automatic.

For each of the two comparisons described above, a set of automatically-generated lexical chains is compared directly with a set of human-generated lexical chains as follows: For each human-generated lexical chain $c_h$, the PC similarity measure from above is used to find the automatically-generated lexical chain $c_a$ that is most similar to $c_h$. An automatically-generated lexical chain ca may be selected as a best match (out of all automatically-generated chains) for more than one human-generated chain. For each algorithm, a comparison score is computed for each human by summing all similarity scores involving that human and dividing by the number of chains created by that annotator. An average score is computed for each algorithm by averaging the comparison scores mentioned above for that algorithm. Significance tests (between the results of two lexical chaining algorithms A and B) are performed by comparing all similarity scores obtained from algorithm A (one score for each human-generated chain) with all scores obtained from algorithm B using the paired t-test.

As described in above, the characteristic adjective filter allows adjectives with a non-characteristic-ness score below some given threshold $\chi$ to be included in lexical chains. As $\chi$ approaches 0, the bc algorithm approaches the b algorithm (no adjectives) in functionality. Similarly, as $\chi$ approaches 100, bc approaches the ba algorithm (all adjectives). For each task described above, and for each of the two papers $P_1$ and $P_2$, X is allowed to vary from 1 to 100.

Each of the two comparison tasks was performed on papers $P_1$ and $P_2$ using the gold standard of human-generated lexical chains from above. Significance results were computed using the paired t-test to compare the performance of the different algorithms.

Figure 44:
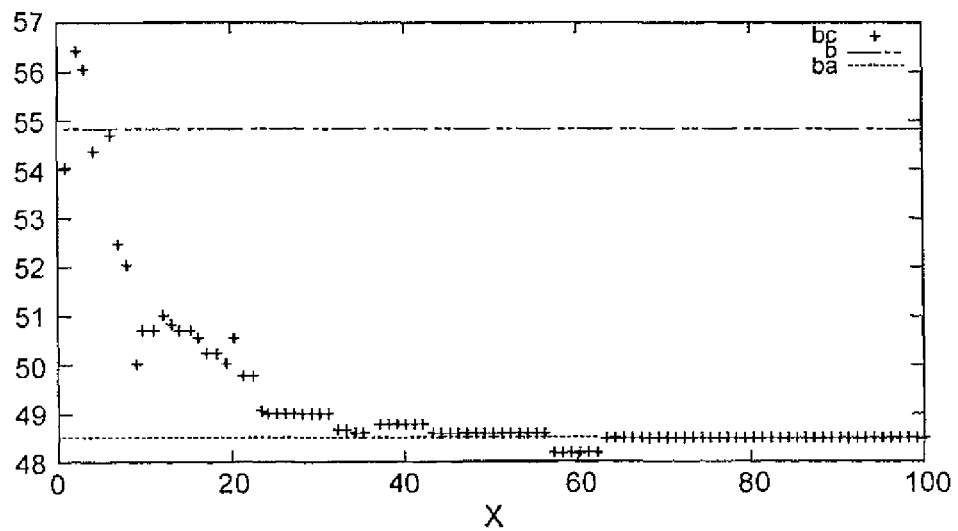
FIG. 44 shows task 1 (paper $P_1$) as the characteristic-ness threshold varies.

Consider Comparison Task 1 (choosing the n-strongest automatically-generated chains). We can see from FIGS. 44 and 45 (which show values of $\chi$ on the horizontal axis and similarity scores on the vertical axis) that, for both papers P1 and P2, there exist characteristic-ness thresholds $\chi$ such that the use of characteristic adjectives produces lexical chains that are more similar than chains produced using all adjectives to the human-generated lexical chains in the gold standard.

For paper $P_1$, a characteristic-ness threshold of $\chi=3$ (filtering out 93.80% of all adjectives in the ACL Anth Corpus) results in the similarity scores shown in FIG. 46. Algorithm bc receives a score of 56.08 and significantly outperforms algorithm ba (with a score of 48.50), as does the base algorithm b. Algorithm bc is the highest scoring algorithm and significantly outperforms every algorithm except for b and bs (cf, FIG. 47).

Figure 45:
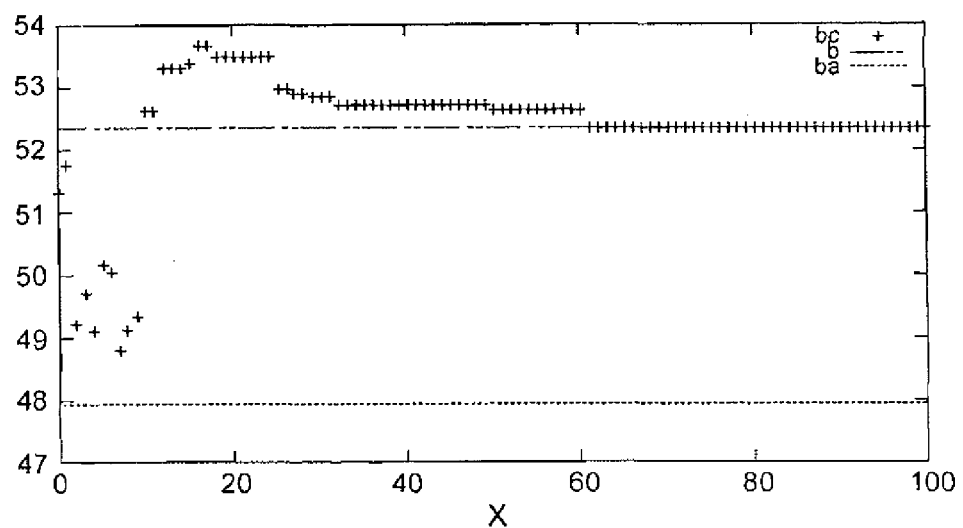
FIG. 45 shows task 1 (paper $P_2$) as the characteristic-ness threshold varies.

For paper $P_2$, algorithm bc starts outperforming ba at $\chi=10$ (filtering out 78.31% of the adjectives), as can be seen from FIG. 45. This improvement is significant at $\chi=16$ (filtering out 69.48% of the adjectives), at which point bc is the highest scoring algorithm (with a score of 53.64) and significantly outperforms algorithms ba (52.34), b (47.93), bw (43.69), and bws (42.10) (cf, FIGS. 48 and 49).

Figures 50, 51, 52:
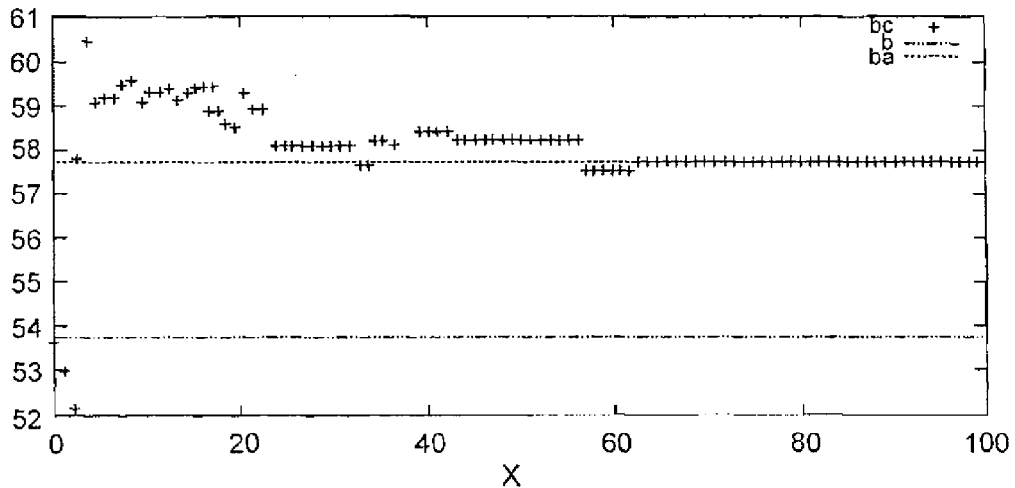
FIG. 50 shows task 2 (paper $P_1$) as the characteristic-ness threshold varies.
FIG. 51 shows similarity scores for task 2 (paper $P_1$) with $\chi=20$.
FIG. 52 shows significance for task 2 (paper $P_1$) with $\chi=20$.

Now consider Comparison Task 2 (choosing the automatically-generated lexical chains that most closely match the human-generated chains). For paper $P_1$, algorithm ba received a score of 57.77, significantly outperforming b, which received a score of 53.78. As seen in FIG. 50 the bc algorithm has performance peaks at $\chi=3$ (resulting in a score of 60.45) and $\chi=20$ (resulting in a score of 59.31). In each case, bc outperforms ba. However, the improvement is only significant at the second peak (i.e., at $\chi=20$ which filters out 64.11% of all adjectives). In this case the slightly higher average score of 60.45 does not yield a significant increase while the score of 59.31 does. This is because significance is performed by comparing (for two lexical chaining algorithms) similarity scores from the union of all human-generated chains while the average similarity score is the average of the annotator scores. FIGS. 51 and 52 show that bc is the highest-scoring algorithm and significantly outperforms all algorithms except bwc, bwsc, and bsc (the other algorithms that included characteristic adjectives).

Figures 53, 54, 55:
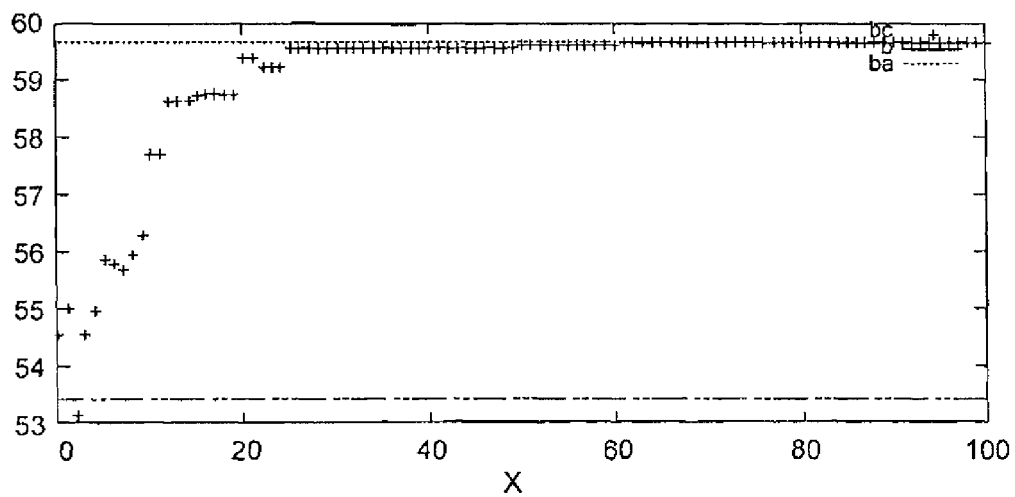
FIG. 53 shows task 2 (paper $P_2$) as the characteristic-ness threshold varies.
FIG. 54 shows similarity scores for task 2 (paper $P_2$) with $\chi=12$.
FIG. 55 shows significance for task 2 (paper $P_2$) with $\chi=12$.

For paper $P_2$, as seen from FIG. 53 algorithm ba outperforms bc for all values of $\chi$. Algorithms ba and bc become identical at $\chi=61$, but the difference between ba and bc ceases to be significant at $\chi=12$ (filtering out 75.09% of all adjectives). FIGS. 54 and 55 show results for all algorithms at $\chi=12$. The five highest scoring algorithms are the five that involve adjectives; the bc algorithm has the second highest score (58.66) followed by bsc (58.11), bwsc (58.10), and bwc (57.43).

For both comparison tasks, and both papers, the inclusion of adjectives significantly increases the similarity between automatically-generated lexical chains and human-generated lexical chains over using no adjectives at all. In three out of four of the experiments, lexical chains created when using the characteristic adjective filter were more similar to the human-generated chains than the chains created when considering all adjectives for inclusion in lexical chain terms. As expected, all similarity scores for Comparison Task 1 (the strongest automatically-generated chains are compared to the human-generated chains) are lower than the similarity scores for Comparison Task 2 (the automatically-generated chains that most closely match the human-generated chains are used for comparison).

For Comparison Task 2, algorithm ba significantly outperforms algorithm bc for paper $P_2$. Perhaps this is because, while the human annotators used many characteristic adjectives, they also used non-characteristic adjectives. Only two annotators created lexical chains for both papers $P_1$ and $P_2$.

The following two comparison tasks (described above) are performed:

1. Strongest chains: Given a set of n human-generated lexical chains, the n strongest lexical chains (from a set of automatically-generated lexical chains) are compared to the human-generated lexical chains. This comparison task corresponds to the task of a text skimmer to create a set of lexical chains that represents the key topics in a paper.
2. Closest matching chains: Given a set of n human-generated lexical chains, the n automatically-generated chains that most closely match the human-generated lexical chains are selected for the final comparison. This comparison corresponds to the task of a text skimmer to create lexical chains that can be recognised by humans in isolation. It has the benefit of not penalizing a lexical chain algorithm for not selecting the right chains (based on strength). However, this comparison has the disadvantage of requiring human data in order to select the "best" chains.

A significant improvement in the quality of lexical chains (according to comparisons with human-generated chains) can be made when characteristic adjectives are included in terms used in lexical chains. This improvement is evident independent of the other properties of the chaining algorithm.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

All rights including copyrights in the code included herein are vested in and the property of the Applicant. The Applicant retains and reserves all rights in the code included herein, and grants permission to reproduce the material only in connection with reproduction of the granted patent and for no other purpose.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

What is claimed is:

1. A method for filtering adjectives from a lexical chain, the method comprising:
   receiving, at a processor, the lexical chain comprising an adjective, the lexical chain being a component of an input document;
   calculating a non-characteristic-ness score based on the adjective's usage within the input document according to linguistic tests, the non-characteristic-ness score being a function of at least a frequency of the adjective's usage in the input document and a gradability non-characteristic-ness score for the adjective;
   testing, by the processor, the adjective to determine if the adjective is at least one of the following: a characteristic adjective and a non-characteristic adjective, wherein testing the adjective comprises comparing the non-characteristic-ness score to a threshold score;
   removing, by the processor, the adjective from the lexical chain when the non-characteristic-ness score is above the threshold score; and
   leaving, by the processor, the adjective in the lexical chain when the non-characteristic-ness score is below the threshold score.

2. The method of claim 1, wherein testing the adjective comprises determining if the adjective is a non-characteristic adjective, wherein a non-characteristic adjective can be removed from a collocation without changing the meaning of the collocation.

3. The method of claim 1, wherein determining if the adjective is at least one of the following: the characteristic adjective and non-characteristic adjective comprises determining a gradability property.

4. The method of claim 1, wherein determining if the adjective is at least one of the following: the characteristic adjective and non-characteristic adjective comprises determining a nominalization property.

5. The method of claim 1, wherein the lexical chain comprises a collocation.

6. The method of claim 5, further comprising determining, by the processor, if the collocation is a technical term.

7. The method of claim 1, further comprising transmitting the at least one lexical chain to a remote computing device.

8. The method of claim 1, further comprising broadcasting the at least one lexical chain via a speech synthesizer.

9. The method of claim 1, wherein testing the adjective occurs without using a stop-list.

10. The method of claim 1, wherein calculating the non-characteristic-ness score according to linguistic tests comprises:
    assigning a point value based on each of the linguistic tests; and
    summing the point values for each of the linguistic tests.

11. The method of claim 1, wherein receiving the adjective comprises receiving multiple documents, each document containing at least one adjective.

12. A method for filtering adjectives before or during formation of a lexical chain, the method comprising:
    receiving, at a processor, an adjective;
    calculating, by the processor, a non-characteristic-ness score for the adjective, wherein calculating the non-characteristic-ness score comprises assigning a point value to the adjective based on linguistic tests and the adjective's usage within at least one input document, the non-characteristic-ness score being a function of a predication non-characteristic-ness score and a gradability non-characteristic-ness score for the adjective;
    testing, by the processor, the adjective to determine if the adjective is at least one of the following: a characteristic adjective and a non-characteristic adjective, wherein testing the adjective comprises comparing the non-characteristic-ness score to a threshold score;
    when the adjective is a non-characteristic adjective, forming, by the processor, the lexical chain without using the adjective;
    when the adjective is a characteristic adjective, forming, by the processor, the lexical chain, wherein the lexical chain comprises the adjective.

13. The method of claim 12, wherein testing the adjective occurs without using a stop-list.

14. A method for filtering adjectives from a lexical chain, the method comprising:
    receiving, at a processor, the lexical chain comprising an adjective, the lexical chain being a component of an input document;
    calculating a non-characteristic-ness score based on the adjective's usage within the input document according to linguistic tests, the non-characteristic-ness score being a function of at least a frequency of the adjective's usage in the input document and a predication non-characteristic-ness score for the adjective;
    testing, by the processor, the adjective to determine if the adjective is at least one of the following: a characteristic adjective and a non-characteristic adjective, wherein testing the adjective comprises comparing the non-characteristic-ness score to a threshold score;
    removing, by the processor, the adjective from the lexical chain when the non-characteristic-ness score is above the threshold score; and
    leaving, by the processor, the adjective in the lexical chain when the non-characteristic-ness score is below the threshold score.

15. The method of claim 14, wherein the non-characteristic-ness score is further a function of a gradability non-characteristic-ness score for the adjective.

* * * * *